US012719161B2

(12) United States Patent
Wang et al.

(10) Patent No.: US 12,719,161 B2
(45) Date of Patent: Aug. 25, 2026

(54) TERMINAL ANTENNA AND METHOD FOR CONTROLLING BEAM DIRECTION OF ANTENNA

(71) Applicant: Honor Device Co., Ltd., Shenzhen (CN)

(72) Inventors: Yu Wang, Shenzhen (CN); Dawei Zhou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 347 days.

(21) Appl. No.: 18/262,310

(22) PCT Filed: Dec. 19, 2022

(86) PCT No.: PCT/CN2022/140159
§ 371 (c)(1),
(2) Date: Jul. 20, 2023

(87) PCT Pub. No.: WO2023/155582
PCT Pub. Date: Aug. 24, 2023

(65) Prior Publication Data

US 2024/0396206 A1 Nov. 28, 2024

(30) Foreign Application Priority Data

Feb. 17, 2022 (CN) ......................... 202210144213.6

(51) Int. Cl.
*H01Q 3/24* (2006.01)
*G01S 13/02* (2006.01)
(Continued)

(52) U.S. Cl.
CPC ........... *H01Q 3/24* (2013.01); *G01S 13/0209* (2013.01); *G01S 13/426* (2013.01); *H01Q 1/243* (2013.01); *H01Q 9/0407* (2013.01)

(58) Field of Classification Search
CPC ........ H01Q 3/24; H01Q 1/243; H01Q 9/0407; H01Q 1/2266; H01Q 5/25; H01Q 1/36;
(Continued)

(56) References Cited

U.S. PATENT DOCUMENTS 4,751,513 A 6/1988 Daryoush et al.
8,717,245 B1 * 5/2014 Krivokapic ............ H01Q 5/378 343/807

(Continued)

FOREIGN PATENT DOCUMENTS

CN 102306870 A 1/2012
CN 110690566 A 1/2020

(Continued)

*Primary Examiner* — Dhaval V Patel
(74) *Attorney, Agent, or Firm* — WOMBLE BOND DICKINSON (US) LLP

(57) ABSTRACT

Embodiments of this application disclose a terminal antenna and a method for controlling a beam direction of an antenna, and can expand a coverage range of a beam direction of a UWB antenna, thereby improving a positioning ability of the UWB antenna. The terminal antenna includes: a first radiator, a second radiator, and a switch module. The first radiator is connected to an end of the switch module, and the second radiator is connected to an other end of the switch module. The first radiator is provided with a feed point. A working status of the switch module includes an on state and an off state. In this application, by controlling the working status of the switch module, the coverage range of the beam direction of the UWB antenna is changed, thereby improving the positioning ability of the antenna.

13 Claims, 15 Drawing Sheets

(51) Int. Cl.

| | |
|---|---|
| ***G01S 13/42*** | (2006.01) |
| ***H01Q 1/24*** | (2006.01) |
| ***H01Q 9/04*** | (2006.01) |

(58) Field of Classification Search

CPC ... H01Q 1/22; H01Q 1/38; H01Q 1/48; G01S 13/0209; G01S 13/426; G01S 3/043; G01S 3/48

See application file for complete search history.

(56) References Cited

U.S. PATENT DOCUMENTS

| | | | | |
|---|---|---|---|---|
| 11,158,938 | B2 * | 10/2021 | Rodríguez | H01Q 5/385 |
| 2001/0002821 | A1 * | 6/2001 | Katou | H01Q 1/28 342/352 |
| 2012/0105286 | A1 | 5/2012 | Rhyu et al. | |
| 2013/0027240 | A1 | 1/2013 | Chowdhury | |
| 2015/0236408 | A1 * | 8/2015 | Kona | H01Q 21/22 343/750 |
| 2018/0177667 | A1 * | 6/2018 | Uemura | A61B 5/112 |
| 2020/0412412 | A1 * | 12/2020 | Su | H01Q 1/48 |
| 2022/0094053 | A1 * | 3/2022 | Jiang | H01Q 5/42 |
| 2022/0247071 | A1 | 8/2022 | Ryu et al. | |
| 2022/0416834 | A1 | 12/2022 | You et al. | |
| 2023/0024815 | A1 * | 1/2023 | Jervis | H01Q 21/30 |
| 2023/0163469 | A1 | 5/2023 | Yun et al. | |

FOREIGN PATENT DOCUMENTS

| | | | |
|---|---|---|---|
| CN | 112152689 | A | 12/2020 |
| CN | 112261669 | A | 1/2021 |
| CN | 114188707 | A | 3/2022 |
| GB | 2386781 | A | 9/2003 |
| GB | 2386781 | B | 3/2006 |
| WO | 0120718 | A1 | 3/2001 |
| WO | 2021010685 | A1 | 1/2021 |
| WO | 2021047385 | A1 | 3/2021 |
| WO | 2022019680 | A1 | 1/2022 |

* cited by examiner

TERMINAL ANTENNA AND METHOD FOR CONTROLLING BEAM DIRECTION OF ANTENNA

CROSS-REFERENCE TO RELATED APPLICATIONS

This application is a national stage of International Application No. PCT/CN2022/140159, filed on Dec. 19, 2022, which claims priority to Chinese Patent Application No. 202210144213.6, filed on Feb. 17, 2022, both of which are incorporated herein by references in their entireties.

TECHNICAL FIELD

Embodiments of this application relate to the field of antennas, and in particular, to a terminal antenna and a method for controlling a beam direction of an antenna.

BACKGROUND

An ultra wideband (Ultra Wideband, UWB) technology is a wireless carrier communication technology. This technology uses a nanosecond-level non-sinusoidal narrow impulse to transmit a signal, and the transmitted signal has a strong penetrating ability and is insusceptible to interference. Therefore, the UWB technology is widely applied to precise positioning, detection, and other fields.

An antenna using the UWB technology for communication may be referred to as a UWB antenna. The UWB antenna may position a to-be-detected object in a beam direction. The beam direction is a direction of a main lobe in a directivity pattern of the UWB antenna.

When the to-be-detected object is located outside the beam direction of the antenna, the antenna cannot position or cannot accurately position the to-be-detected object.

SUMMARY

The embodiments of this application provide a terminal antenna and a method for controlling a beam direction of an antenna, and can expand a coverage range of the beam direction of the antenna, thereby improving a positioning ability of the antenna.

To achieve the foregoing objective, the following technical solutions are used in the embodiments of this application:

According to a first aspect, a terminal antenna is provided. The terminal antenna includes: a first radiator, a second radiator, and a switch module. The first radiator is connected to an end of the switch module, and the second radiator is connected to an other end of the switch module. The first radiator is provided with a feed point. A working status of the switch module includes an on state and an off state.

Based on this solution, when the working status of the switch module is the off state, the first radiator and the second radiator are not connected, only the first radiator in the terminal antenna works, and a current in the first radiator flows from the feed point to the switch module. Therefore, a radiation field of the terminal antenna has a maximum value in a normal direction of the first radiator, and an angle range of coverage of a beam direction of the terminal antenna is within a normal line of the first radiator $\pm\alpha°$, where $0\leq\alpha<90$. When the working status of the switch module is the on state, the first radiator and the second radiator are connected and both work. The current in the first radiator flows from an end of the first radiator connected to the switch module to an other end of the first radiator. A current in the second radiator flows from an end of the second radiator connected to the switch module to an other end of the second radiator. Therefore, the angle range of the coverage of the beam direction of the antenna may be from a normal line of the second radiator $+\alpha°$ to the normal line of the second radiator $+90°$, and/or from the normal line of the first radiator-go to the normal line of the first radiator $-90°$. Therefore, the terminal antenna provided in this embodiment of this application can change the beam direction through the turn-on or turn-off of the switch module, thereby expanding the coverage range of the beam direction of the terminal antenna and improving the positioning ability of the terminal antenna.

In a possible design, the terminal antenna is a UWB terminal antenna, and further includes a dielectric board and a grounding board. The first radiator and the second radiator are arranged above the dielectric board, and the grounding board is arranged below the dielectric board. Based on this solution, the arrangement of the dielectric board and the grounding board is conducive to improving the working performance of the terminal antenna.

In a possible design, when the working status of the switch module is the off state, a beam direction of a main lobe of the terminal antenna is a first direction. When the working status of the switch module is the on state, the beam direction of the main lobe of the terminal antenna is a second direction. The first direction and the second direction are different. Based on this solution, the beam direction of the terminal antenna can be changed through the turn-on or turn-off of the switch module, thereby expanding the coverage range of the beam direction of the terminal antenna and improving the positioning ability of the terminal antenna.

In a possible design, a long side length of the first radiator and/or a long side length of the second radiator is determined based on a half of a wavelength of an operating frequency band of the terminal antenna. Based on this solution, the determining of the long side length of the first radiator and/or the long side length of the second radiator according to the half of the wavelength of the operating frequency band of the terminal antenna is conducive to improving the working performance of the terminal antenna.

In a possible design, the switch module is a PIN diode. Based on this solution, the working status of the switch module can be switched more conveniently. According to a second aspect, an electronic device is provided. The electronic device includes: a first chip and the terminal antenna according to the first aspect. The first chip is connected to the switch module and the feed point separately. The terminal antenna is configured to receive a to-be-detected signal sent by a to-be-detected object. The first chip is configured to obtain the to-be-detected signal through the feed point. The first chip is further configured to control the working status of the switch module according to strength of the to-be-detected signal.

Based on this solution, after the first chip obtains the to-be-detected signal, whether the working status of the switch module needs to be switched may be determined according to the strength of the to-be-detected signal, thereby expanding a coverage range of a beam direction of the terminal antenna, increasing a possibility of covering a position of the to-be-detected object by the beam direction of the terminal antenna, and improving a positioning ability of the terminal antenna.

In a possible design, when the strength of the to-be-detected signal is less than a first threshold, the first chip switches the working status of the switch module. Based on this solution, when the working status of the switch module is changed, the beam direction of the terminal antenna is also changed, thereby expanding the coverage range of the beam direction of the terminal antenna and improving the positioning ability of the terminal antenna.

In a possible design, when the working status of the switch module is the on state, and the strength of the to-be-detected signal is less than the first threshold, the first chip switches the working status of the switch module to the off state. When the working status of the switch module is the off state, and the strength of the to-be-detected signal is less than the first threshold, the first chip switches the working status of the switch module to the on state. Based on this solution, when the strength of the to-be-detected signal is weak, the beam direction of the terminal antenna is switched by switching the working status of the switch module, thereby expanding the coverage range of the beam direction of the terminal antenna, increasing the possibility of covering the position of the to-be-detected object by the beam direction of the terminal antenna, and improving the positioning ability of the terminal antenna.

In a possible design, the electronic device further includes an attitude sensor. The attitude sensor is connected to the first chip. The attitude sensor is configured to determine an inclination angle of the electronic device. The first chip is further configured to control the working status of the switch module according to the inclination angle. Based on this solution, controlling the working status of the switch module according to the inclination angle of the electronic device is conducive to increasing the possibility of covering the position of the to-be-detected object by the beam direction of the terminal antenna.

In a possible design, an inclination angle at which the electronic device is placed vertically is used by the attitude sensor as a 0 degree inclination angle. Based on this solution, the attitude sensor can more accurately determine the inclination angle of the electronic device.

In a possible design, when the inclination angle is greater than a first preset angle, the first chip controls the working status of the switch module to be the on state. When the inclination angle is less than or equal to the first preset angle, the first chip controls the working status of the switch to be the off state. Based on this solution, when the to-be-detected object is located at the periphery of the electronic device, there is a high possibility that the beam direction of the terminal antenna covers the position of the to-be-detected object, which is conducive to improving the positioning ability of the terminal antenna.

According to a third aspect, a method for controlling a beam direction of an antenna is provided. The method is applied to the electronic device according to the second aspect and is for positioning a to-be-detected object. The method includes the following steps: receiving, by the terminal antenna, a to-be-detected signal sent by a to-be-detected object; and controlling, by the first chip, the working status of the switch module according to strength of the to-be-detected signal.

Based on this solution, after the first chip obtains the to-be-detected signal, whether the working status of the switch module needs to be switched may be determined according to the strength of the to-be-detected signal, thereby expanding a coverage range of a beam direction of the terminal antenna, increasing a possibility of covering a position of the to-be-detected object by the beam direction of the terminal antenna, and improving a positioning ability of the terminal antenna.

In a possible design, the controlling, by the first chip, the working status of the switch module according to strength of the to-be-detected signal includes: switching, by the first chip, the working status of the switch module when the strength of the to-be-detected signal is less than a first threshold. Based on this solution, when the working status of the switch module is changed, the beam direction of the terminal antenna is also changed, thereby expanding the coverage range of the beam direction of the terminal antenna and improving the positioning ability of the terminal antenna.

In a possible design, the switching, by the first chip, the working status of the switch module when the strength of the to-be-detected signal is less than a first threshold includes: switching, by the first chip, the working status of the switch module to the off state when the working status of the switch module is the on state, and the strength of the to-be-detected signal is less than the first threshold; and switching, by the first chip, the working status of the switch module to the on state when the working status of the switch module is the off state, and the strength of the to-be-detected signal is less than the first threshold. Based on this solution, when the strength of the to-be-detected signal is weak, the beam direction of the terminal antenna is switched by switching the working status of the switch module, thereby expanding the coverage range of the beam direction of the terminal antenna, increasing the possibility of covering the position of the to-be-detected object by the beam direction of the terminal antenna, and improving the positioning ability of the terminal antenna.

In a possible design, the electronic device includes an attitude sensor. Before the controlling, by the first chip, the working status of the switch module according to strength of the to-be-detected signal, the method further includes: determining, by the attitude sensor, an inclination angle of the electronic device; and controlling, by the first chip, the working status of the switch module according to the inclination angle. Based on this solution, controlling the working status of the switch module according to the inclination angle of the electronic device is conducive to increasing the possibility of covering the position of the to-be-detected object by the beam direction of the terminal antenna.

In a possible design, the determining, by the attitude sensor, an inclination angle of the electronic device includes: using, by the attitude sensor, an inclination angle at which the electronic device is placed vertically as a 0 degree inclination angle. Based on this solution, the attitude sensor can more accurately determine the inclination angle of the electronic device.

In a possible design, the controlling, by the first chip, the working status of the switch module according to the inclination angle includes: controlling, by the first chip, the working status of the switch module to be the on state when the inclination angle is greater than a first preset angle; and controlling, by the first chip, the working status of the switch module to be the off state when the inclination angle is less than or equal to the first preset angle. Based on this solution, when the to-be-detected object is located at the periphery of the electronic device, there is a high possibility that the beam direction of the terminal antenna covers the position of the to-be-detected object, which is conducive to improving the positioning ability of the terminal antenna.

In a possible design, the first preset angle is 60 degrees.

According to a fourth aspect, an electronic device is provided. The electronic device includes one or more processors and one or more memories. The one or more memories are coupled to the one or more processors, and the one or more memories store computer instructions. When the one or more processors execute the computer instructions, the electronic device performs the method for controlling a beam direction of an antenna provided in the third aspect and possible designs thereof.

According to a fifth aspect, a chip is provided, and the chip includes a processing circuit and an interface. The processing circuit is configured to invoke a computer program stored in a storage medium and run the computer program, to perform the method for controlling a beam direction of an antenna provided in the third aspect and possible designs thereof.

According to a sixth aspect, a computer-readable storage medium is provided, including a computer instruction. When the computer instruction is run, the method for controlling a beam direction of an antenna provided in the third aspect and possible designs thereof is performed.

It is to be understood that the technical features of the technical solutions provided in the fourth, fifth, and sixth aspects above can all correspond to the method for controlling a beam direction of an antenna provided in the third aspect and possible designs thereof, so the similar beneficial effects can be achieved. Details are not described herein again.

DESCRIPTION OF EMBODIMENTS

In the embodiments of this application, "first", "second", "third", and the like are intended to distinguish between different objects but do not indicate a particular order. In addition, the term such as "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. In particular, the terms such as "exemplary" and "for example" as used herein are intended to present the related concept in a specific implementation.

For ease of understanding the embodiments of this application, the following first describes an application background of the embodiments of this application.

UWB antennas are usually integrated in an electronic device in a form of an array. An electronic device can position a to-be-detected object through a UWB antenna array.

Figure 1:
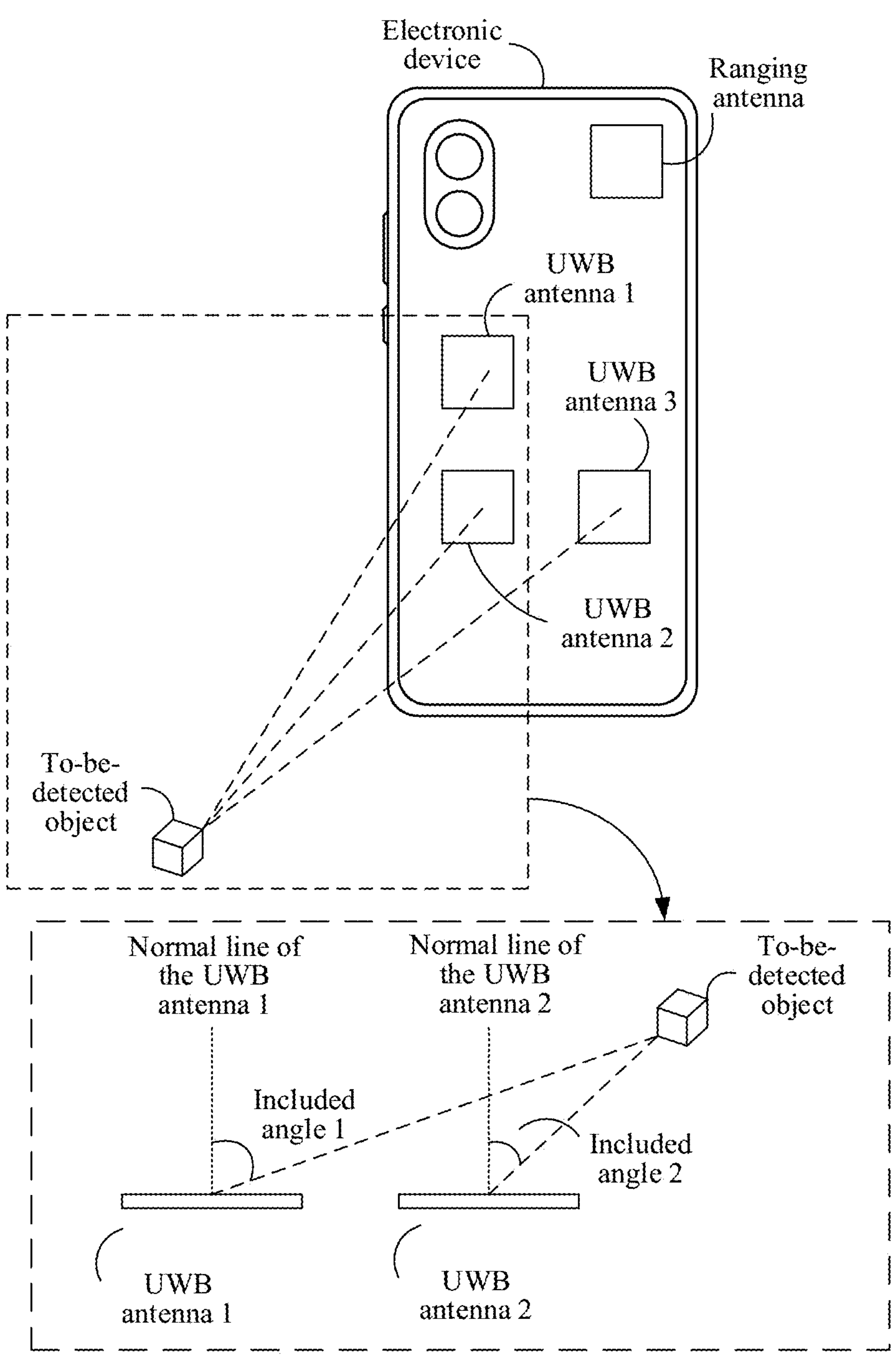
FIG. 1 is a schematic diagram of a UWB antenna array in an electronic device.

FIG. 1 is a schematic diagram of a UWB antenna array in an electronic device. As shown in FIG. 1, the UWB antenna array may include a UWB antenna 1, a UWB antenna 2, and a UWB antenna 3. A straight line in which the UWB antenna 1 and the UWB antenna 2 are located is perpendicular to a straight line in which the UWB antenna 2 and the UWB antenna 3 are located. The electronic device can position a to-be-detected object through cooperation of the UWB antenna 1, the UWB antenna 2, and the UWB antenna 3 with a ranging antenna. An example in which the UWB antennas are patch antennas is used, and a positioning process may be implemented by the following steps.

S101. The electronic device receives, through antennas, a to-be-detected signal sent by a to-be-detected object.

The antennas include the UWB antenna 1, the UWB antenna 2, the UWB antenna 3, and the ranging antenna. The to-be-detected signal may be the foregoing non-sinusoidal narrow impulse.

S102. The electronic device measures an included angle 1, an included angle 2, and an included angle 3 (not shown in FIG. 1) through the UWB antenna 1, the UWB antenna 2, and the UWB antenna 3, and measures a distance between the electronic device and the to-be-detected object through the ranging antenna.

As shown in FIG. 1, the included angle 1 is an angle of arrival of the to-be-detected signal to the UWB antenna 1. In other words, the included angle 1 is an included angle between a straight line in which the to-be-detected object and the UWB antenna 1 are located and a normal line of the UWB antenna 1. The included angle 2 is an angle of arrival of the to-be-detected signal to the UWB antenna 2. In other words, the included angle 2 is an included angle between a straight line in which the to-be-detected object and the UWB antenna 2 are located and a normal line of the UWB antenna 2. The included angle 3 is an angle of arrival of the to-be-detected signal to the UWB antenna 3. In other words, the included angle 3 is an included angle between a straight line in which the to-be-detected object and the UWB antenna 3 are located and a normal line of the UWB antenna 3.

The electronic device may determine the included angle 1 and the included angle 2 according to a difference between a phase value of the to-be-detected signal upon arriving at the UWB antenna 1 and a phase value of the to-be-detected signal upon arriving at the UWB antenna 2, and determine the included angle 3 according to a difference between the phase value of the to-be-detected signal upon arriving at the UWB antenna 2 and a phase value of the to-be-detected signal upon arriving at the UWB antenna 3. A difference between phase values of the to-be-detected signal upon arriving at two antennas may be referred to as a phase difference of arrival. In an example, the electronic device may pre-store a mapping relationship between a phase difference of arrival and an angle of arrival, for example, a phase difference of arrival (Phase Difference of Arrival, PDOA) curve of a signal. The electronic device may measure a phase difference of arrival of the to-be-detected signal to the UWB antenna 1 and the UWB antenna 2 through the UWB antenna 1 and the UWB antenna 2, and measure a phase difference of arrival of the to-be-detected signal to the UWB antenna 2 and the UWB antenna 3 through the UWB antenna 2 and the UWB antenna 3, and then determine an angle of arrival of the to-be-detected signal to the UWB antenna 1, an angle of arrival of the to-be-detected signal to the UWB antenna 2, and an angle of arrival of the to-be-detected signal to the UWB antenna 3 according to the PDOA curve. In addition, the ranging antenna may calculate a distance between the electronic device and the to-be-detected object according to time when the to-be-detected object sends the to-be-detected signal, time when the ranging antenna receives the to-be-detected signal, and a transmission speed of the to-be-detected signal in the air. The to-be-detected signal is an electromagnetic wave and the transmission speed of the to-be-detected signal is the speed of light.

S103. The electronic device determines a position of the to-be-detected object according to the included angle 1, the included angle 2, the included angle 3, and the distance between the electronic device and the to-be-detected object.

In an example, the position of the to-be-detected object may be determined through a positioning algorithm based on an angle of arrival (Angle of Arrival, AOA). Specifically, in the AOA positioning algorithm, relative bearings or angles between the UWB antennas and the to-be-detected object may be calculated through the angles of arrival of the to-be-detected signal to the UWB antennas, and then the position of the to-be-detected object is calculated by using a triangulation method or another method.

As can be seen from the foregoing positioning process, whether the UWB antennas can receive the to-be-detected signal sent by the to-be-detected object in S102 is crucial to whether the positioning process can continue. Whether the UWB antennas can receive the to-be-detected signal is associated with whether the beam directions of the UWB antennas cover the position of the to-be-detected object.

It is to be noted that, a beam direction of a UWB antenna may correspond to a direction of a beam in which a main lobe of a directivity pattern of the UWB antenna is located. An example in which the UWB antenna is a patch antenna is used. The main lobe of the directivity pattern of the UWB antenna may refer to a lobe within a normal line of the patch antenna with reduced 3 dB gain when the patch antenna works. In other words, the main lobe may correspond to a beam or lobe with a strong gain in gain distribution indicated by the directivity pattern of the patch antenna.

Figure 2:
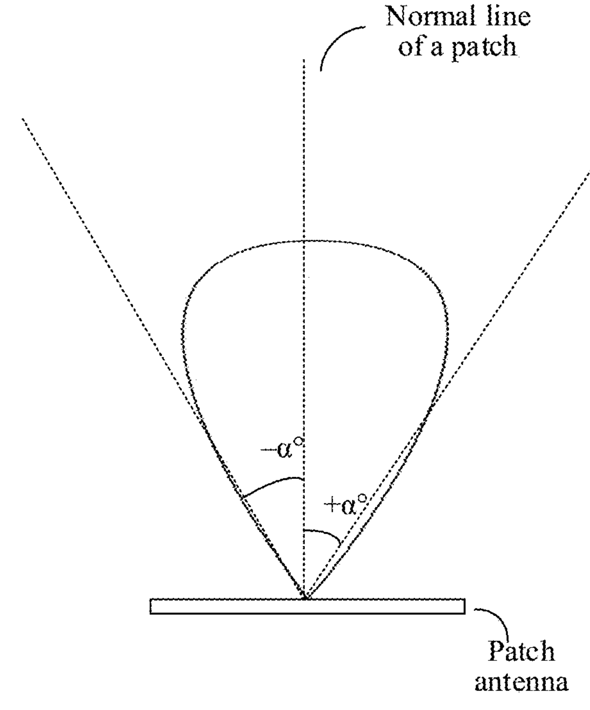
FIG. 2 is a schematic diagram of a beam direction of a UWB antenna.

It may be understood that a beam in which the main lobe is located may cover an angle range with a normal line as a center line. FIG. 2 is a schematic diagram of a beam direction of a UWB antenna. As shown in FIG. 2, an angle range correspond to the main lobe may include a normal line of a patch antenna $\pm\alpha°$, where $0\leq\alpha<90$. When the to-be-detected object is located within the normal line of the patch antenna $\pm\alpha°$, the UWB antenna can receive a strong to-be-detected signal. When the to-be-detected object is located outside the normal line of the patch antenna $\pm\alpha°$, the to-be-detected signal received by the UWB antenna is weak or even the to-be-detected signal cannot be received.

When the beam direction of the UWB antenna covers the position of the to-be-detected object, the UWB antenna can receive a strong to-be-detected signal. When the beam direction of the UWB antenna does not cover the position of the to-be-detected object, the to-be-detected signal received by the UWB antenna is weak or even the to-be-detected signal cannot be received. As a result, the to-be-detected object cannot be positioned or accurately positioned.

To resolve the foregoing problems, the embodiments of this application provide an antenna and a method for controlling a beam direction of an antenna, and can expand a coverage range of a beam direction of a UWB antenna and thereby improve a positioning ability of the UWB antenna.

The antenna provided in the embodiments of this application is described in detail below.

Figure 3:
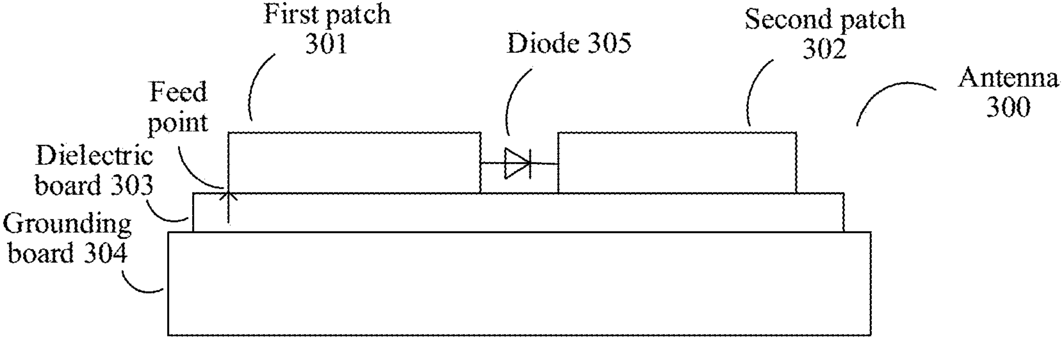
FIG. 3 is a schematic diagram of a side surface of an antenna according to an embodiment of this application.

FIG. 3 is a schematic diagram of a side surface of an antenna 300 according to an embodiment of this application. In this embodiment of this application, the antenna structure may be used for implementation of the UWB antenna.

As shown in FIG. 3, the antenna 300 may include a first patch 301, a second patch 302, a dielectric board 303, a grounding board 304, and a diode 305. The first patch 301 and the second patch 302 both are arranged on a first side surface of the dielectric board 303. The grounding board 304 is arranged on a second side surface of the dielectric board 303. The first patch 301 is connected to an input end of the diode 305, and the second patch 302 is connected to an output end of the diode 305. A feed point is arranged on the first patch 301. In an example, a groove may be arranged between the first patch 301 and the second patch 302, and the diode 305 may be arranged in the groove. In addition, the diode 305 may be replaced with another switch module that can control connection and disconnection of the first patch and the second patch. Turn-on of the diode may be the switch module in an on state, and turn-off of the diode may be the switch module in an off state. This is not limited in this application.

In some embodiments, the first patch 301 may be referred to as a first radiator, and the second patch 302 may be referred to as a second radiator. In some other embodiments, the first patch 301 may alternatively be referred to as a second radiator, and the second patch 302 may alternatively be referred to as a first radiator. In addition, the antenna 300 may alternatively be referred to as a terminal antenna.

In this embodiment of this application, the first patch 301 and the second patch 302 both are a rectangular patch antenna. An operating frequency band of the antenna 300 may be a first frequency band. A length of the first patch 301 may be determined according to a ¼ or ½ wavelength of the first frequency band. Similarly, a length of the second patch 302 may be determined according to a ¼ or ½ wavelength of the first frequency band.

In different implementations of this embodiment of this application, the diode 305 may have different states, for example, an on or off state. Different states of the diode may indicate different beam directions of the antenna 300.

Figure 4:
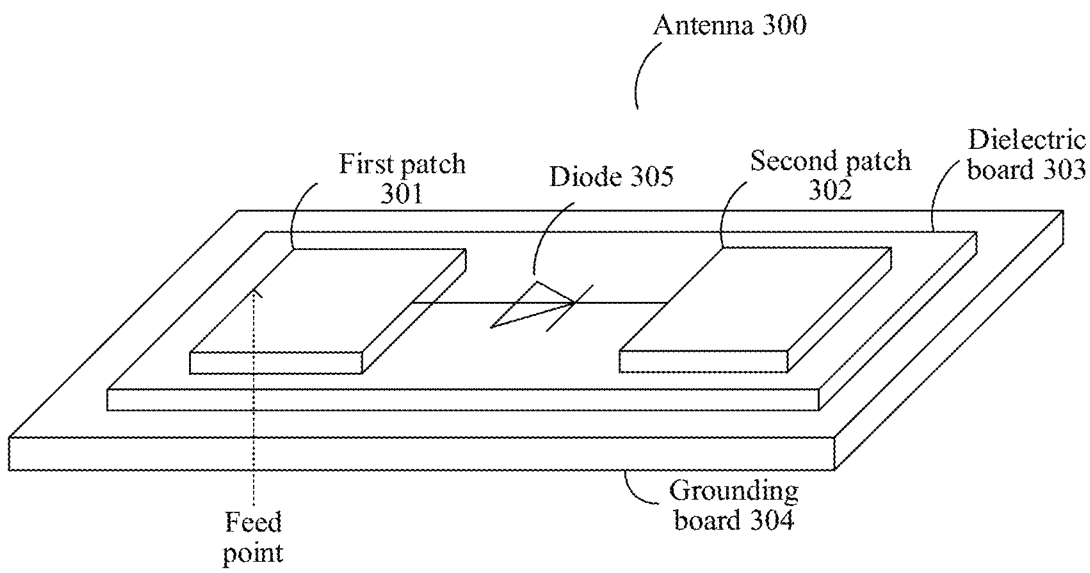
FIG. 4 is a schematic structural diagram of an antenna according to an embodiment of this application.

FIG. 3 is a schematic diagram of a side surface of the antenna 300 according to an embodiment of this application. FIG. 4 is a schematic structural diagram of the antenna 300 according to an embodiment of this application. As shown in FIG. 4, the first patch 301, the second patch 302, and the diode 305 may be arranged above the dielectric board 303, and the grounding board 304 may be arranged below the dielectric board 303. A short side of the first patch 301 and a short side of the second patch 302 are connected through the diode 305.

For example, beam directions of the antenna 300 when the diode 305 in FIG. 3 is turned on and turned off are described below separately. In this embodiment of this application, a longer side of the first patch 301 and a longer side of the second patch 302 are the same in length, and a shorter side of the first patch 301 and a shorter side of the second patch 302 may be the same or different in length. This is not limited herein. If the first patch 301 and the second patch 302 both are a square, side lengths of the first patch 301 and the second patch 302 may be the same.

When the diode 305 in FIG. 3 is turned off, the second patch 302 is disconnected, and only the first patch 301 works. A current in the first patch flows from where the feed point is located to where the diode 305 is located, and therefore the beam direction of the antenna 300 is the same as the beam direction of the antenna shown in FIG. 2.

For example, the side lengths of the first patch 301 and the second patch 302 both are $\lambda/2$, and the diode 305 is turned off. The antenna 300 may be equivalent to a patch antenna with a length of $\lambda/2$. $\lambda$ is a wavelength of a first frequency band of the antenna 300. As shown in FIG. 2, a radiation field of the antenna has a maximum value in a normal direction of the patch, and an angle range of coverage of the beam direction of the antenna is within a normal line of the first patch 301 $\pm\alpha°$, where $0\leq\alpha<90$. When the normal line of the first patch 301 $\pm\alpha°$ covers the position of the to-be-detected object, the antenna can receive a strong to-be-detected signal.

In this example, when the diode 305 is turned off, the state of the antenna 300 may correspond to a first mode of the antenna working in a ½ wavelength. It may be understood that, the antenna may also work in another mode, for example, a second mode in a 1-fold wavelength.

For ease of description, the beam direction of the antenna 300 when the diode 305 is turned off is referred to as a first direction below.

In other words, when the diode 305 in FIG. 3 is turned off, the beam direction of the antenna 300 provided in FIG. 3 is a first direction, and the antenna 300 may position a to-be-detected object located in the first direction.

When the diode 305 in FIG. 3 is turned on, the first patch 301 and the second patch 302 are connected, and the first patch 301 and the second patch 302 both work. The current in the first patch 301 flows in a direction from the diode 305 to where the feed point is located, and a current in the second patch 302 flows from an end of the second patch 302 connected to the diode 305 to an other end of the second patch 302. Therefore, the beam direction of the antenna 300 shown in FIG. 3 is directed to two sides of the normal line of the patch respectively.

Figure 5:
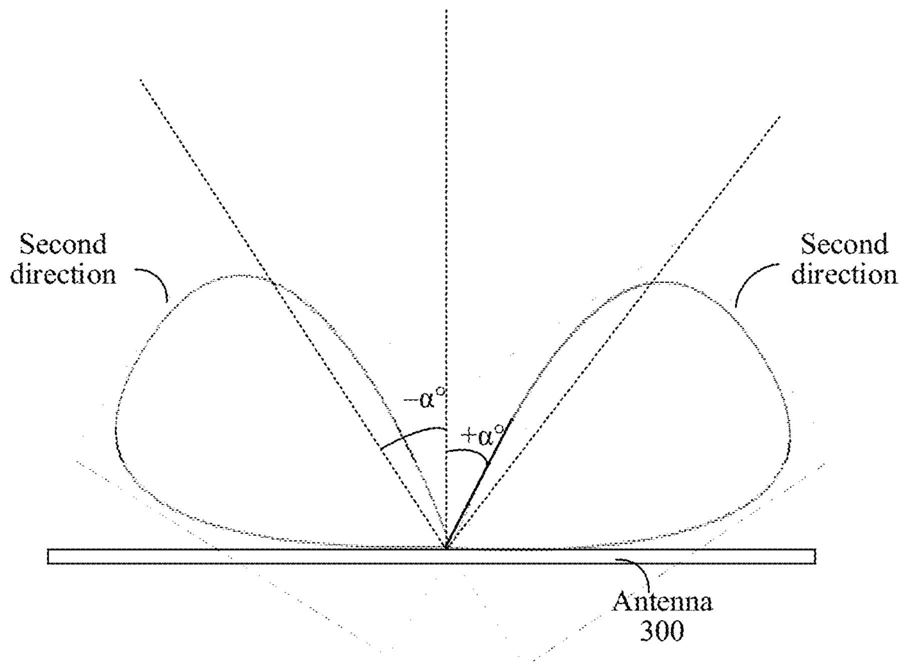
FIG. 5 is a schematic diagram of a beam direction of an antenna according to an embodiment of this application.

For example, the side lengths of the first patch 301 and the second patch 302 in FIG. 3 both are $\lambda/2$, and the diode 305 is turned on. The antenna 300 shown in FIG. 3 may be equivalent to a patch antenna with a length of $\lambda$. FIG. 5 is a schematic diagram of a beam direction of an antenna according to an embodiment of this application. As shown in FIG. 5, an angle range of coverage of the beam direction of the antenna may include a normal line of the patch $+\alpha°$ to the normal line of the patch $+90°$, and/or the normal line of the patch $-\alpha°$ to the normal line of the patch $-90°$. In this example, when the diode 305 is turned on, the state of the antenna 300 may correspond to a second mode of the antenna working in a 1-fold wavelength.

It is to be noted that, the angle range of the coverage of the beam direction of the antenna shown in FIG. 5 may partially overlap an angle range of coverage of the first direction.

For ease of description, the beam direction of the antenna 300 when the diode 305 is turned on is referred to as a second direction below. The antenna 300 may position a to-be-detected object located in the second direction.

With reference to the foregoing description of FIG. 3 to FIG. 5, when the working status of the diode 305 is an off state, the first patch 301 and the second patch 302 are disconnected, only the first patch 301 in the antenna 300 works, and the current in the first patch 301 flows in a direction from the feed point to the diode 305. Therefore, the radiation field of the antenna 300 has a maximum value in a normal direction of the first patch 301, and the angle range of the coverage of the beam direction of the antenna 300 is within the normal line of the first patch 301 $\pm\alpha°$, where $0\leq\alpha<90$. When the working status of the diode 305 is an on state, the first patch 301 and the second patch 302 are connected and both work. The current in the first patch 301 flows from an end of the first patch 301 connected to the diode 305 to an other end of the first patch 301, and the current in the second patch 302 flows from the end of the second patch 302 connected to the diode 305 to the other end of the second patch 302. Therefore, the angle range of the coverage of the beam direction of the antenna may include a normal line of the second patch 302 $+\alpha°$ to the normal line of the second patch 302 $+90°$, and/or the normal line of the first patch 301 $-\alpha°$ to the normal line of the first patch 301 $-90°$. Therefore, the antenna 300 provided in this embodiment of this application can change the beam direction through the turn-on or turn-off of the diode, thereby expanding the coverage of the beam direction of the antenna 300 and improving the positioning ability of the antenna 300.

The following describes, with reference to FIG. 3 and FIG. 4, feasibility of switching between the first mode and the second mode by the antenna provided in this embodiment of this application. In the following description, a thickness of the dielectric board is 0.3 mm, a dielectric constant of the dielectric board is 3, and a loss factor of the dielectric board is 0.004. The side lengths of the first patch and the second patch both are 10.8 mm. The diode may be a PIN diode. In this embodiment of this application, turn-on of the diode is an ideal on state, and turn-on of the diode is equivalent to a short circuit. Turn-off of the diode is an ideal off state, and turn-off of the diode is equivalent to disconnection.

Figure 6:
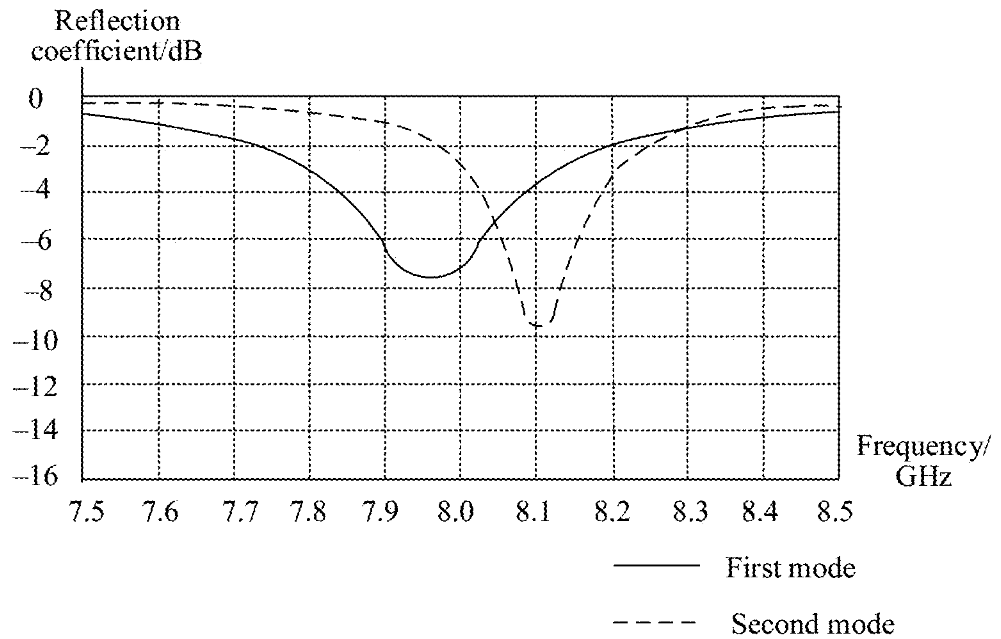
FIG. 6 is a schematic curve diagram of a reflection coefficient of an antenna according to an embodiment of this application.

First, when the antenna provided in this embodiment of this application is switched from the first mode to the second mode, or from the second mode to the first mode, a resonance frequency of the antenna is not greatly affected. The resonance frequency of the antenna may be obtained through a lowest point of a reflection coefficient curve (that is, a curve S11) of the antenna. FIG. 6 is a schematic curve diagram of a reflection coefficient of an antenna according to an embodiment of this application. As shown in FIG. 6, when the antenna works in the first mode, in other words, when the diode in the antenna is turned off, the resonance frequency of the antenna is about 7.95 GHz. When the antenna works in the second mode, in other words, when the diode in the antenna is turned on, the resonance frequency of the antenna is about 8.1 GHz. Therefore, for the antenna provided in this embodiment of this application, the resonance frequency when the antenna is in the first mode and the resonance frequency when the antenna is in the second mode have a small difference. Switching of the mode of the antenna does not greatly affect the resonance frequency of the antenna.

Besides, when the antenna provided in this embodiment of this application is switched from the first mode to the second mode or from the second mode to the first mode, system efficiency of the antenna is not greatly affected.

It is to be understood that, radiation performance of the antenna may be identified by the system efficiency. The system efficiency may be used for identifying an actual radiation situation of the antenna in a current match state of a port.

Figure 7:
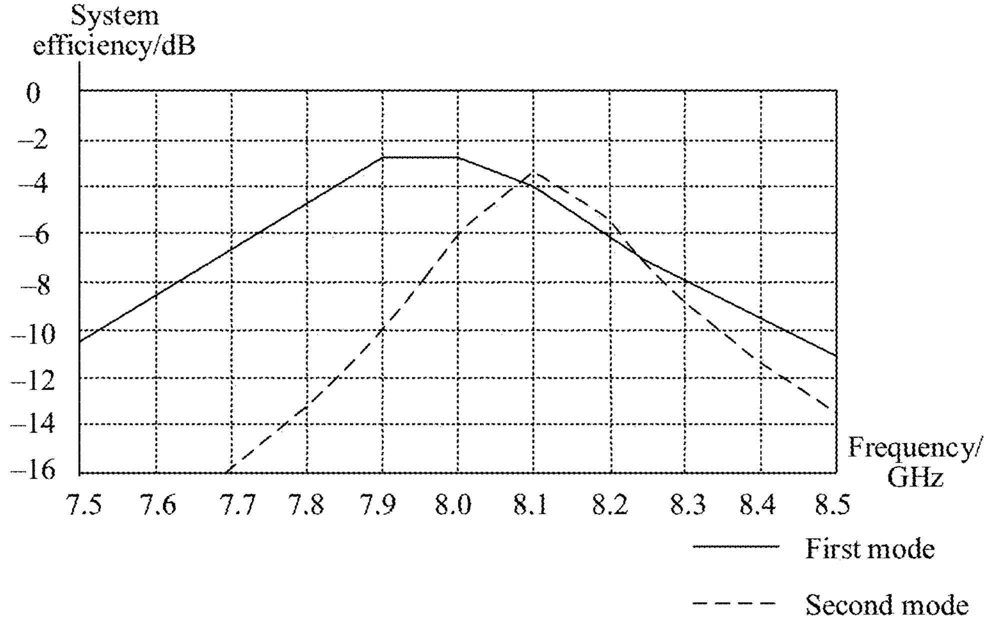
FIG. 7 is a schematic curve diagram of system efficiency of an antenna according to an embodiment of this application.

FIG. 7 is a schematic curve diagram of system efficiency of an antenna according to an embodiment of this application. As shown in FIG. 7, when the antenna works in the first mode, in other words, when the diode in the antenna is turned off, the system efficiency of the antenna at around the resonance frequency is around −3 dB. When the antenna works in the second mode, in other words, when the diode in the antenna is turned on, the system efficiency of the antenna at around the resonance frequency is around −3.5 dB. Therefore, for the antenna provided in this embodiment of this application, the system efficiency of the antenna in the first mode and the system efficiency of the antenna in the second mode have a small difference. Switching of the mode of the antenna does not greatly affect the system efficiency of the antenna.

With reference to the foregoing description of FIG. 6 and FIG. 7, it may be determined that when the antenna provided in this embodiment of this application is switched from the first mode to the second mode or from the second mode to the first mode, the resonance frequency and system efficiency of the antenna are not greatly affected. In other words, it is feasible to perform switching between the first mode and the second mode on the antenna provided in this embodiment of this application.

Figure 8:
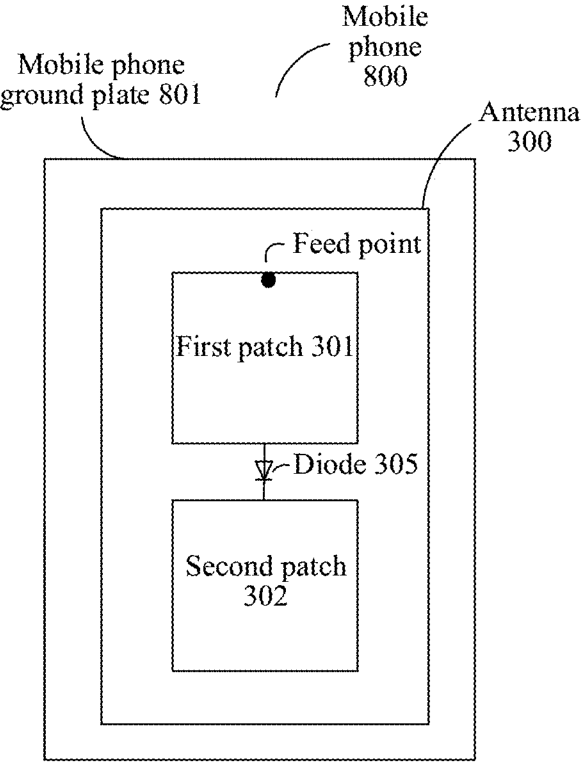
FIG. 8 is a schematic diagram of a mobile phone according to an embodiment of this application.

The antenna provided in this embodiment of this application is arranged in a mobile phone to perform simulation below. FIG. 8 is a schematic diagram of a mobile phone 800 according to an embodiment of this application. As shown in FIG. 8, the mobile phone 800 includes the antenna 300 and a mobile phone ground board 801. When the antenna 300 is arranged in the mobile phone 800, the first patch 301 and the second patch 302 are opposite to the mobile phone ground board 801. Because of the blocking by the mobile phone ground board 801, a gain of the antenna 300 in a direction of the mobile phone ground board 801 is affected to some degree. It is to be noted that, the grounding board 304 in the antenna 300 may be the mobile phone ground board 801.

An example in which dimensions of the mobile phone ground board 801 are 150 mm×75 mm, and a distance from the first patch 301 and the second patch 302 to the mobile phone ground board 801 is 0.2 mm is used in the following simulation process.

First, when the antenna provided in this embodiment of this application works in the first mode, in other words, when the diode in the antenna is turned off, the antenna has a high gain in the first direction and has a low gain in the second direction.

Figure 9:
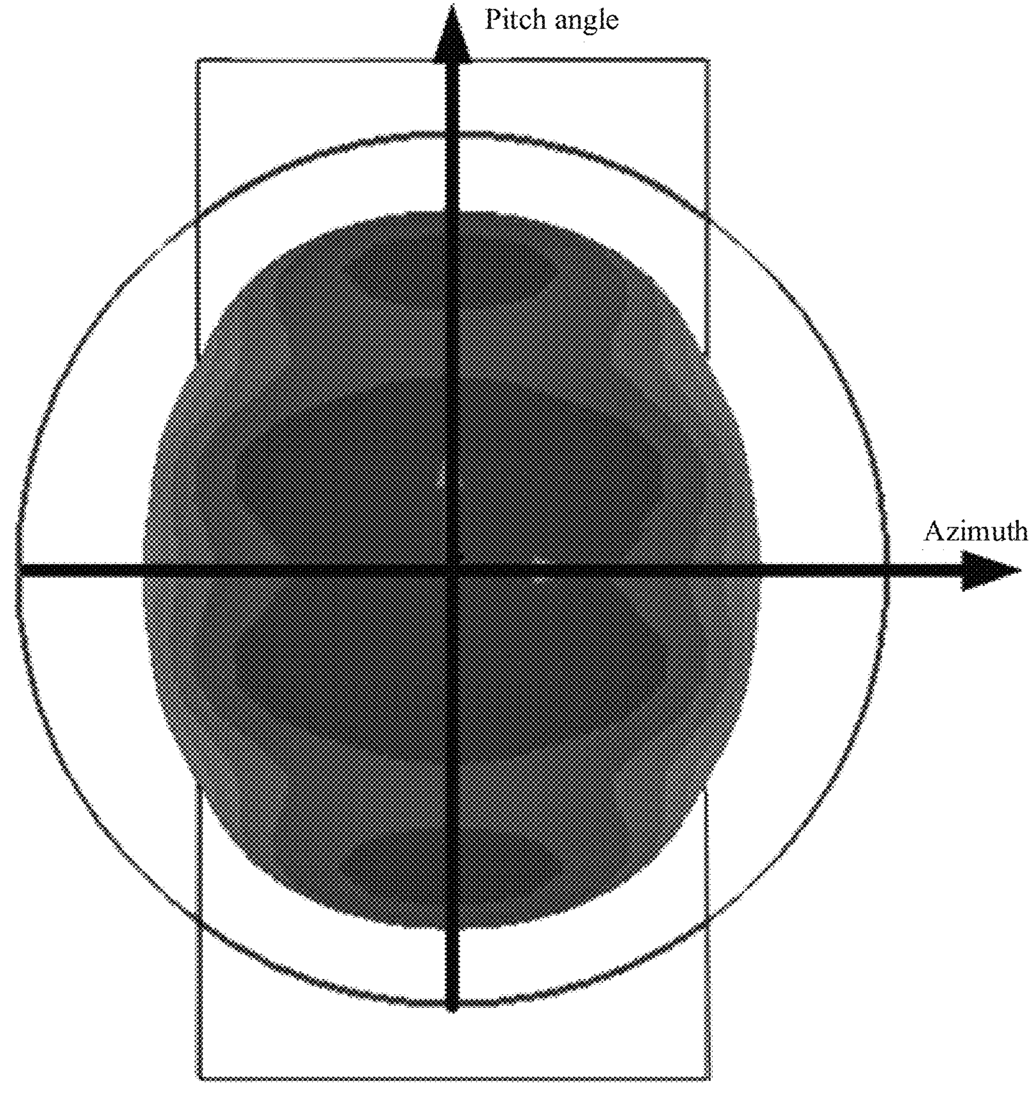
FIG. 9 is a schematic cross-sectional view of a directivity pattern of an antenna working in a first mode according to an embodiment of this application.

FIG. 9 is a schematic cross-sectional view of a directivity pattern of an antenna working in a first mode according to an embodiment of this application. In FIG. 9, a larger gray scale indicates a lower gain, and a smaller gray scale indicates a higher gain. As shown in FIG. 9, when a pitch angle is large, the gain of the antenna in a corresponding direction drops quickly. When the pitch angle is small, the gain of the antenna in a corresponding direction is high. The first direction corresponds to a small pitch angle and the second direction corresponds to a large pitch angle. To be specific, the antenna has a high gain in the first direction and a low gain in the second direction.

Besides, when the antenna provided in this embodiment of this application works in the second mode, in other words, when the diode in the antenna is turned on, the antenna has a high gain in the second direction and has a low gain in the first direction.

Figure 10:
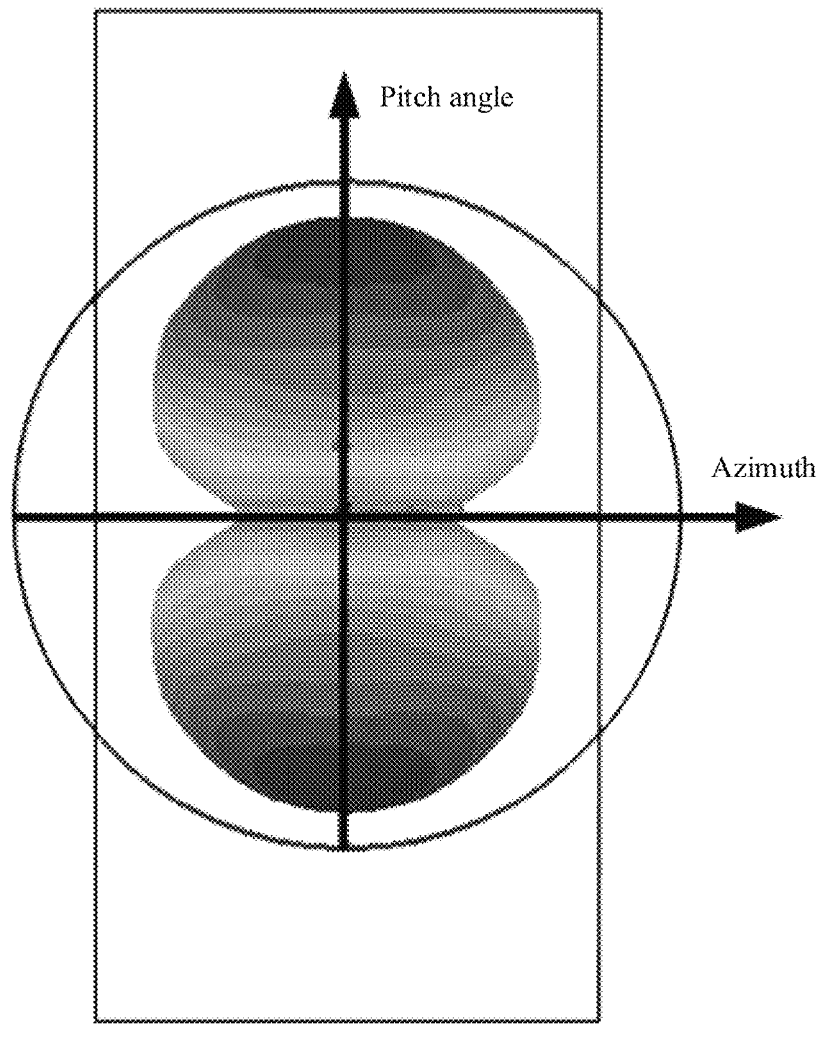
FIG. 10 is a schematic cross-sectional view of a directivity pattern of an antenna working in a second mode according to an embodiment of this application.

FIG. 10 is a schematic cross-sectional view of a directivity pattern of an antenna working in a second mode according to an embodiment of this application. In FIG. 10, a larger gray scale indicates a lower gain, and a smaller gray scale indicates a higher gain. As shown in FIG. 10, when a pitch angle is large, the gain of the antenna in a corresponding direction is high. When the pitch angle is small, the gain of the antenna in a corresponding direction drops quickly. To be specific, the antenna has a high gain in the second direction and a low gain in the first direction.

Figure 11:
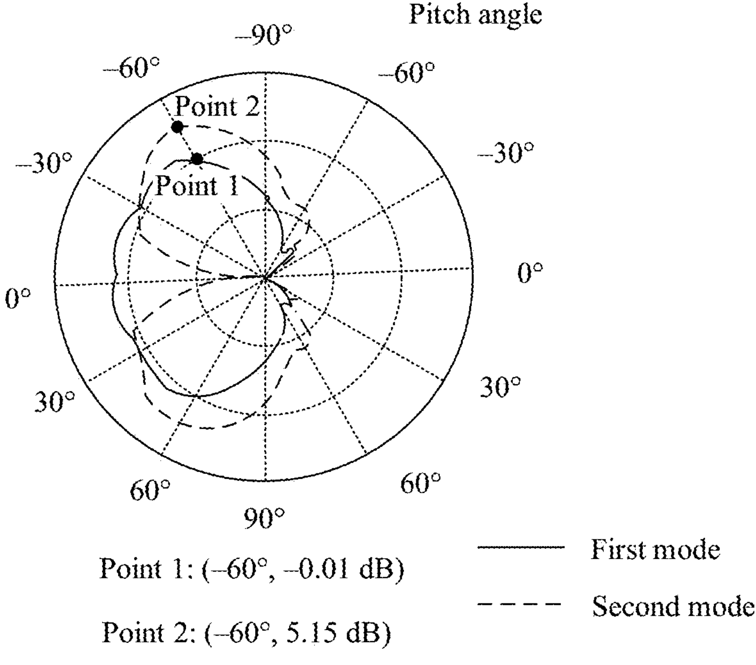
FIG. 11 is a schematic longitudinal sectional view of a directivity pattern of an antenna according to an embodiment of this application.

The following compares gains of the antenna provided in this embodiment of this application working in the first mode and the second mode. FIG. 11 is a schematic longitudinal sectional view of a directivity pattern of an antenna according to an embodiment of this application. As shown in FIG. 11, when a pitch angle is within 60° to 90°, or the pitch angle is within −60° to −90°, the gain (point 2 in FIG. 11) of the antenna working in the second mode is about 5 dB higher than the gain (point 1 in FIG. 11) of the antenna working in the first mode averagely. $\alpha$=60° is used as an example. To be specific, in the second direction, the gain of the antenna working in the second mode is about 5 dB higher than the gain of the antenna working in the first mode averagely.

With reference to the foregoing description of FIG. 9 to FIG. 11, it may be determined that when the antenna provided in this embodiment of this application works in the first mode, the antenna has a strong communication ability in the first direction, and can receive a to-be-detected signal in the first direction, in other words, can position a to-be-detected object in the first direction. When the antenna provided in this embodiment of this application works in the second mode, the antenna has a strong communication ability in the second direction, and can receive a to-be-detected signal in the second direction, in other words, can position a to-be-detected object in the second direction.

The antenna provided in this embodiment of this application is described in FIG. 2 to FIG. 11. A solution to controlling a beam direction of an antenna provided in the embodiments of this application is described in detail below based on the antenna provided in the embodiments of this application. For ease of description, the antenna provided in the embodiments of this application is referred to as a first antenna in the following description. As described above, the first antenna may also be referred to as a terminal antenna.

It is to be noted that, the method for controlling a beam direction of an antenna provided in this embodiment of this application may be applied to an electronic device of a user. The electronic device may be provided with the first antenna. For example, the electronic device may be a portable mobile device provided with the first antenna such as a mobile phone, a tablet computer, a personal digital assistant (personal digital assistant, PDA), an augmented reality (augmented reality, AR) \virtual reality (virtual reality, VR) device, or a media player, or the electronic device may be a wearable electronic device such as a smartwatch. A specific form of the device is not particularly limited in the embodiments of this application.

Figure 12:
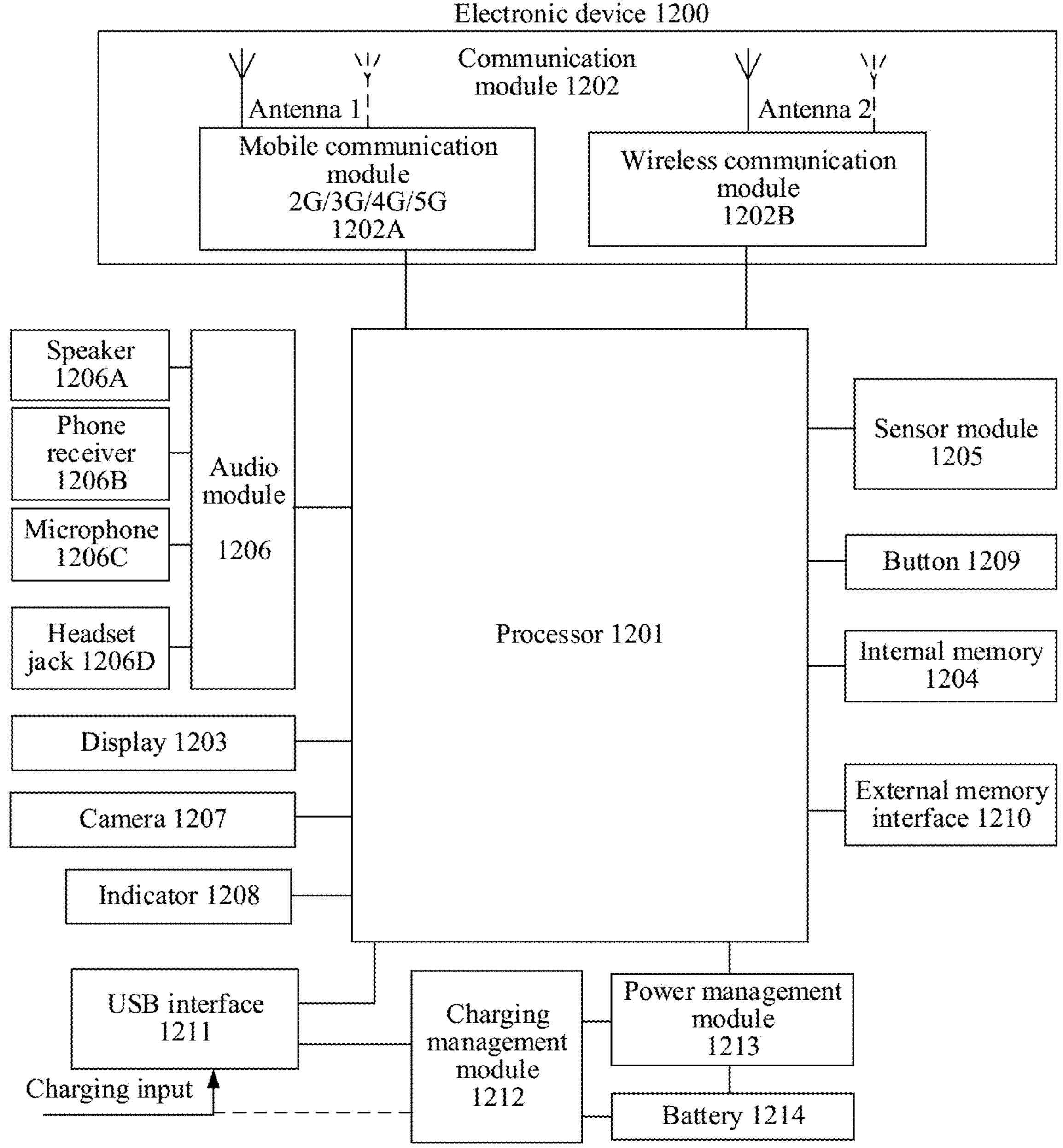
FIG. 12 is a schematic diagram of composition of an electronic device according to an embodiment of this application.

In an example, FIG. 12 is a schematic diagram of composition of an electronic device 1200 according to an embodiment of this application. The method for controlling a beam direction of an antenna provided in this embodiment of this application is applicable to the electronic device 1200 shown in FIG. 12.

As shown in FIG. 12, the electronic device 1200 may include a processor 1201, a display 1203, a communication module 1202, and the like.

The processor 1201 may include one or more processing units. For example, the processor 1201 may include an application processor (application processor, AP), a modem processor, a graphics processing unit (graphics processing unit, GPU), an image signal processor (image signal processor, ISP), a controller, a memory, a video stream codec, a digital signal processor (digital signal processor, DSP), a baseband processor, and/or a neural-network processing unit (neural-network processing unit, NPU), and the like. Different processing units may be independent components, or may be integrated into one or more processors 1201.

The controller may be a nerve center and a command center of the electronic device 1200. The controller may generate an operation control signal according to instruction operation code and a time-sequence signal, and control obtaining and executing of instructions.

A memory may also be disposed in the processor 1201, configured to store instructions and data. In some embodiments, the memory in the processor 1201 is a cache memory. The memory may store an instruction or data that has just been used or cyclically used by the processor 1201. If the processor 1201 needs to use the instruction or the data again, the processor may directly invoke the instruction or the data from the memory, to avoid repeated access and reduce a waiting time of the processor 1201, thereby improving system efficiency.

In some embodiments, the processor 1201 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor 1201 interface (mobile industry processor interface, MIPI), a general-purpose input/output (general-purpose input/output, GPIO) interface, a subscriber identity module (subscriber identity module, SIM) interface, a universal serial bus (universal serial bus, USB) interface 1211, and/or the like.

The electronic device 1200 implements a display function by using the GPU, the display 1203, the AP 1201, and the like. The GPU is a microprocessor for image processing, and is connected to the display 1203 and the AP 1201. The GPU is configured to perform mathematical and geometric calculation, and is configured to render an image. The processor 1201 may include one or more GPUs that execute a program instruction to generate or change display information.

The display 1203 is configured to display an image, a video stream, and the like.

The communication module 1202 may include an antenna 1, an antenna 2, a mobile communication module 1202A, and/or a wireless communication module 1202B. An example in which the communication module 1202 includes the antenna 1, the antenna 2, the mobile communication module 1202A, and the wireless communication module 1202B is used.

A wireless communication function of the electronic device 1200 may be implemented by using the antenna 1, the antenna 2, the mobile communication module 1202A, the wireless communication module 1202B, the modem processor, the baseband processor, and the like.

The antenna 1 and the antenna 2 are configured to transmit and receive electromagnetic wave signals. Each antenna of the electronic device 1200 may be configured to cover one or more communication frequency bands. Different antennas may be multiplexed to improve antenna utilization. For example, the antenna 1 may be multiplexed into a diversity antenna of a wireless local area network. In some other embodiments, the antennas may be used with a tuning switch.

The mobile communication module 1202A may provide a solution to wireless communication such as 2G/3G/4G/5G applied to the electronic device 1200. The mobile communication module 1202A may include at least one filter, a switch, a power amplifier, a low noise amplifier (low noise amplifier, LNA), and the like. The mobile communication module 1202A may receive an electromagnetic wave by using the antenna 1, perform processing such as filtering and amplification on the received electromagnetic wave, and send the electromagnetic wave to the modem processor for demodulation. The mobile communication module 1202A may further amplify a signal modulated by the modem processor, and convert the signal into an electromagnetic wave by using the antenna 1 for radiation. In some embodiments, at least some of functional modules of the mobile communication module 1202A may be disposed in the processor 1201. In some embodiments, at least some of the functional modules of the mobile communication module 1202A may be disposed in a same device as at least some of modules of the processor 1201.

The modem processor may include a modulator and a demodulator. The modulator is configured to modulate a to-be-sent low-frequency baseband signal into a middle/high-frequency signal. The demodulator is configured to demodulate the received electromagnetic wave signal into a low-frequency baseband signal. Then the demodulator transfers the low-frequency baseband signal obtained through demodulation to the baseband processor for processing. The low-frequency baseband signal is processed by the baseband processor and is then transferred to the application processor. The application processor outputs a sound signal by using an audio device (not limited to a speaker 1206A, a phone receiver 1206B, or the like), or displays an image or a video stream by using the display 1203. In some embodiments, the modem processor may be an independent component. In some other embodiments, the modem processor may be independent of the processor 1201, and is disposed in a same device as the mobile communication module 1202A or another function module.

The wireless communication module 1202B may provide a solution to wireless communication applied to the electronic device 1200, for example, a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communication module 1202B may be one or more devices that integrate at least one communication processing module. The wireless communication module 1202B receives an electromagnetic wave through the antenna 2, performs frequency modulation and filtering processing on the electromagnetic wave signal, and sends the processed signal to the processor 1201. The wireless communication module 1202B may also receive a to-be-sent signal from the processor 1201, perform frequency modulation and amplification on the to-be-sent signal, and convert the signal into an electromagnetic wave for radiation through the antenna 2.

In some embodiments, the antenna 1 and the mobile communication module 1202A of the electronic device 1200 are coupled, and the antenna 2 and the wireless communication module 1202B of the electronic device 1200 are coupled, so that the electronic device 1200 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS) and/or satellite-based augmentation systems (satellite based augmentation systems, SBAS).

As shown in FIG. 12, in some implementations, the electronic device 1200 may further include an external memory interface 1210, an internal memory 1204, a universal serial bus (universal serial bus, USB) interface 1211, a charging management module 1212, a power management module 1213, a battery 1214, an audio module 1206, a speaker 1206A, a phone receiver 1206B, a microphone 1206C, a headset jack 1206D, a sensor module 1205, a button 1209, a motor, an indicator 1208, a camera 1207, a subscriber identity module (subscriber identity module, SIM) card interface, and the like.

The charging management module 1212 is configured to receive charging input from a charger. The charger may be a wireless charger, or may be a wired charger. In some embodiments of wired charging, the charging management module 1212 may receive charging input of the wired charger through the USB interface 1211. In some embodiments of wireless charging, the charging management module 1212 may receive wireless charging input by using a wireless charging coil of the electronic device 1200. When charging the battery 1214, the charging management module 1212 may further supply power to the electronic device 1200 by using the power management module 1213.

The power management module 1213 is configured to be connected to the battery 1214, the charging management module 1212, and the processor 1201. The power management module 1213 receives an input of the battery 1214 and/or the charging management module 1212, to supply power to the processor 1201, the internal memory 1204, an external memory, the display 1203, the camera 1207, the wireless communication module 1202B, and the like. The power management module 1213 may be further configured to monitor a parameter such as a capacity of the battery 1214, a cycle count of the battery 1214, or a health state (electric leakage and impedance) of the battery 1214. In some other embodiments, the power management module 1213 may alternatively be disposed in the processor 1201. In some other embodiments, the power management module 1213 and the charging management module 1212 may alternatively be disposed in a same device.

The external memory interface 1210 may be configured to be connected to an external storage card such as a micro SD card, to expand a storage capability of the electronic device 1200. The external storage card communicates with the processor 1201 by using the external memory interface 1210, so as to implement a data storage function, for example, store files such as music and a video stream into the external storage card.

The internal memory 1204 may be configured to store computer-executable program code. The executable program code includes an instruction. The processor 1201 runs the instruction stored in the internal memory 1204, to implement various functional applications and data processing of the electronic device 1200.

The electronic device 1200 may implement an audio function such as music playing or recording by using the audio module 1206, the speaker 1206A, the phone receiver 1206B, the microphone 1206C, the headset jack 1206D, the AP 1201, and the like.

The button 1209 includes a power button, a volume button, and the like. The button 1209 may be a mechanical button 1209, or a touch-type button 1209. The electronic device 1200 may receive an input of the button 1209, and generate a button signal input related to user setting and function control of the electronic device 1200.

The indicator 1208 may be an indicator light that may be configured to indicate a charging state and a power change, or may be configured to indicate a message, a missed call, a notification, and the like.

The SIM card interface is configured to connect to a SIM card. The SIM card may be inserted into the SIM card interface or plugged from the SIM card interface, to come into contact with or be separated from the electronic device 1200.

The sensor module 1205 in the electronic device 1200 may include a component such as a touch sensor, a pressure sensor, a gyro sensor, a barometric pressure sensor, a magnetic sensor, an acceleration sensor, a distance sensor, an optical proximity sensor, an ambient light sensor, a fingerprint sensor, a temperature sensor, or a bone conduction sensor, to implement a sensing and/or obtaining function for different signals.

It may be understood that the schematic structure in this embodiment constitutes no specific limitation on the electronic device 1200. In some other embodiments, the electronic device 1200 may include more or fewer components than those shown in the figures, or some components may be combined, or some components may be split, or components are arranged in different manners. The components in the figure may be implemented by hardware, software, or a combination of software and hardware.

When the method for controlling a beam direction of an antenna provided in this embodiment of this application is applied to the electronic device 1200, the electronic device 1200 further includes the first antenna. In the electronic device, a diode in the first antenna is controlled to be turned on, so that the first antenna works in a second mode, or the diode in the first antenna is controlled to be turned off, so that the first antenna works in a first mode.

With reference to the electronic device provided in FIG. 12, the method for controlling a beam direction of an antenna provided in this application is described below.

Figure 13:
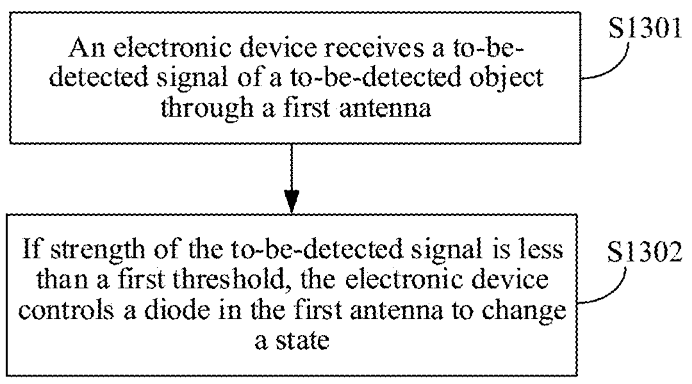
FIG. 13 is a flowchart of a method for controlling a beam direction of an antenna according to an embodiment of this application.

FIG. 13 is a flowchart of a method for controlling a beam direction of an antenna according to an embodiment of this application. As shown in FIG. 13, the method for controlling a beam direction of an antenna includes S1301 to S1302.

S1301. The electronic device receives a to-be-detected signal of a to-be-detected object through the first antenna.

The to-be-detected object may be an Internet of Things (Internet of Things, IoT) device. The electronic device may detect a to-be-detected signal sent by the Internet of Things device, and position the Internet of Things device according to the to-be-detected signal.

S1302. If strength of the to-be-detected signal is less than a first threshold, the electronic device controls the diode in the first antenna to change a state.

In this embodiment of this application, that the strength of the to-be-detected signal is less than the first threshold at least includes that the strength of the to-be-detected signal is 0 or the strength of the to-be-detected signal is greater than 0 and less than the first threshold.

That the strength of the to-be-detected signal is κ means that the first antenna does not receive the to-be-detected signal. For example, the to-be-detected object is located in a second direction, but the first antenna works in the first mode and the beam direction of the first antenna is a first direction. In this case, the first antenna cannot receive the to-be-detected signal sent by the to-be-detected object.

That the strength of the to-be-detected signal is greater than 0 and less than the first threshold means that the first antenna can receive the to-be-detected signal, but the strength of the to-be-detected signal is weak, and the first antenna cannot accurately position the to-be-detected object according to the weak to-be-detected signal. For example, the to-be-detected object is located in the first direction, but the antenna works in the second mode and the beam direction of the first antenna is the second direction. In this case, the strength of the to-be-detected signal received by the first antenna may be weak.

In this embodiment of this application, that the diode changes the state may at least includes that the diode changes from an on state to an off state, and the diode changes from the off state to the on state. S1302 may include the following S1302*a* and S1302*b*.

S1302*a*. When the first antenna works in the first mode, in other words, when the beam direction of the first antenna is the first direction, if the strength of the to-be-detected signal is less than the first threshold, the electronic device controls the diode in the first antenna to change from the off state to the on state.

If the strength of the to-be-detected signal detected when the beam direction of the first antenna is the first direction is weak, it indicates that the to-be-detected object is not located in the first direction. In the electronic device provided in this embodiment of this application, the diode in the first antenna is changed from the off state to the on state, so that the beam direction of the first antenna is changed into the second direction. In this way, the first antenna can continue to detect, in the second direction, the to-be-detected signal, to determine whether the to-be-detected object is located in the second direction.

S1302*b*. When the first antenna works in the second mode, in other words, when the beam direction of the first antenna is the second direction, if the strength of the to-be-detected signal is less than the first threshold, the electronic device controls the diode in the first antenna to change from the on state to the off state.

If the strength of the to-be-detected signal detected when the beam direction of the first antenna is the second direction is weak, it indicates that the to-be-detected object is not located in the second direction. In the electronic device provided in this embodiment of this application, the diode in the first antenna is changed from the on state to the off state, so that the beam direction of the first antenna is changed into the first direction. In this way, the first antenna can continue to detect, in the first direction, the to-be-detected signal, to determine whether the to-be-detected object is located in the first direction.

It is to be noted that, S1302 may be executed by a UWB chip in the electronic device. S1302 may be: if the UWB chip determines that the strength of the to-be-detected signal is less than the first threshold, the diode in the first antenna is controlled to change the state.

In this embodiment of this application, the UWB chip may also be referred to as a first chip.

Figure 14:
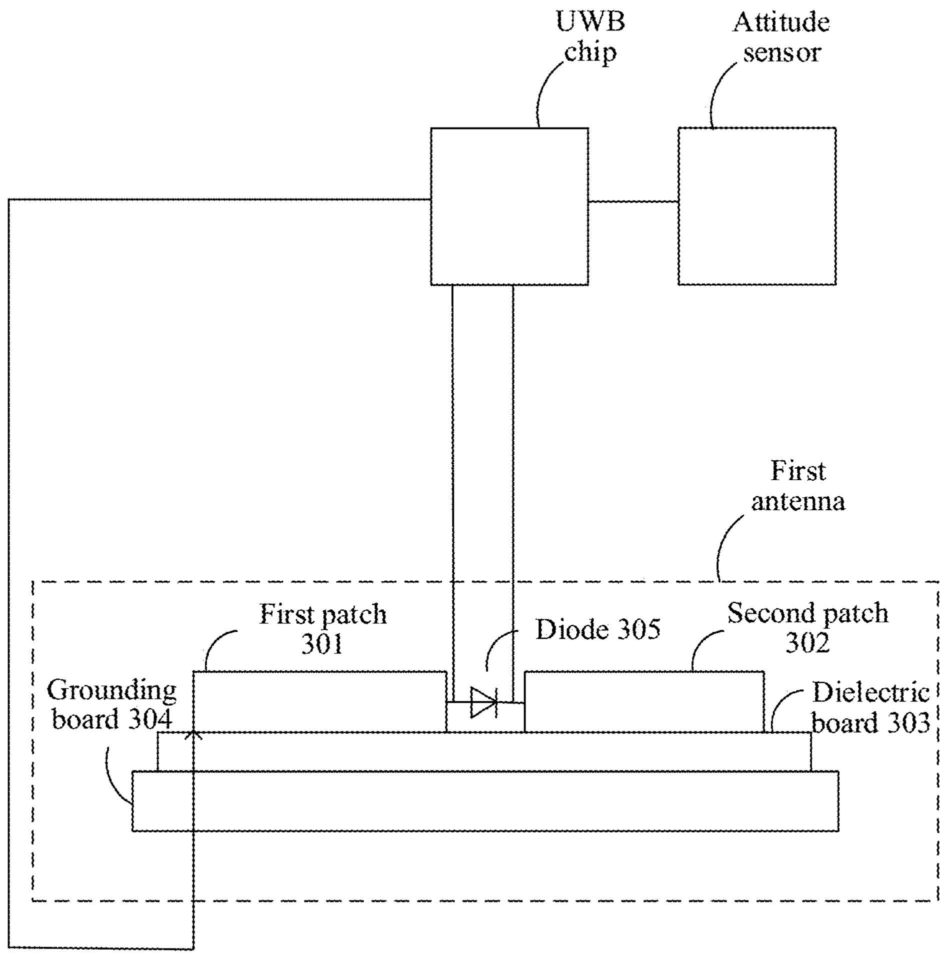
FIG. 14 is a schematic diagram of connection of a first antenna according to an embodiment of this application.

FIG. 14 is a schematic diagram of connection of a first antenna according to an embodiment of this application. As shown in FIG. 14, the UWB chip is separately connected to two ends of the diode and a feed point of the first antenna. For example, when the diode is a PIN diode, the UWB chip may control the diode to be turned on by sending a forward bias signal to the diode, or control the diode to be turned off by sending a reverse bias signal to the diode.

As can be seen from S1302*a* and S1302*b*, in the method for controlling a beam direction of an antenna provided in this embodiment of this application, when the first antenna cannot receive to the to-be-detected signal or the received to-be-detected signal has weak strength, the beam direction of the first antenna is changed, to expand a detection range of the to-be-detected signal and increase a possibility of detecting the to-be-detected signal.

Generally, when a user holds the electronic device to search for a to-be-detected object, the to-be-detected object that needs to be positioned is located in front, rear, left, right, or the like of the electronic device, and there is a low possibility that the to-be-detected object is located above or below the electronic device. Therefore, when the electronic device is placed vertically, and when the beam direction of the first antenna is the first direction, there is a high possibility that the to-be-detected signal is detected. When the electronic device is placed horizontally, and when the beam direction of the first antenna is the second direction, there is a high possibility that the to-be-detected signal is detected.

The front, rear, left, and right of the electronic device are described herein. An example in which the electronic device is a mobile phone is used. In this embodiment of this application, the front of the electronic device refers to a direction reverse to a normal direction of a mobile phone backplane when the mobile phone backplane is perpendicular to the ground. The rear of the electronic device is reverse to the front of the electronic device. The right of the electronic device is a direction that is perpendicular to the front of the electronic device and that is parallel to the ground and points to a front right side of the electronic device. The left of the electronic device is reverse to the right of the electronic device. It is to be noted that, in the embodiments of this application, the front, rear, left, right, and the like of the electronic device are fixed directions, and are irrelevant to attitudes of the electronic device. For example, when the electronic device is inclined, the front, rear, left, right, and the like of the electronic device are still the foregoing directions.

To further improve user experience, in the method for controlling a beam direction of an antenna provided in this embodiment of this application, an inclination degree of the electronic device may be further used as a factor in controlling the beam direction of the antenna, which is described in detail below.

As shown in FIG. 14, in this embodiment of this application, the inclination degree of the electronic device may be detected by using an attitude sensor, and the attitude sensor is connected to the UWB chip. The UWB chip may obtain the inclination degree of the electronic device through the attitude sensor, and control the beam direction of the first antenna with reference to the strength of the to-be-detected signal received by the first antenna.

Figure 15:
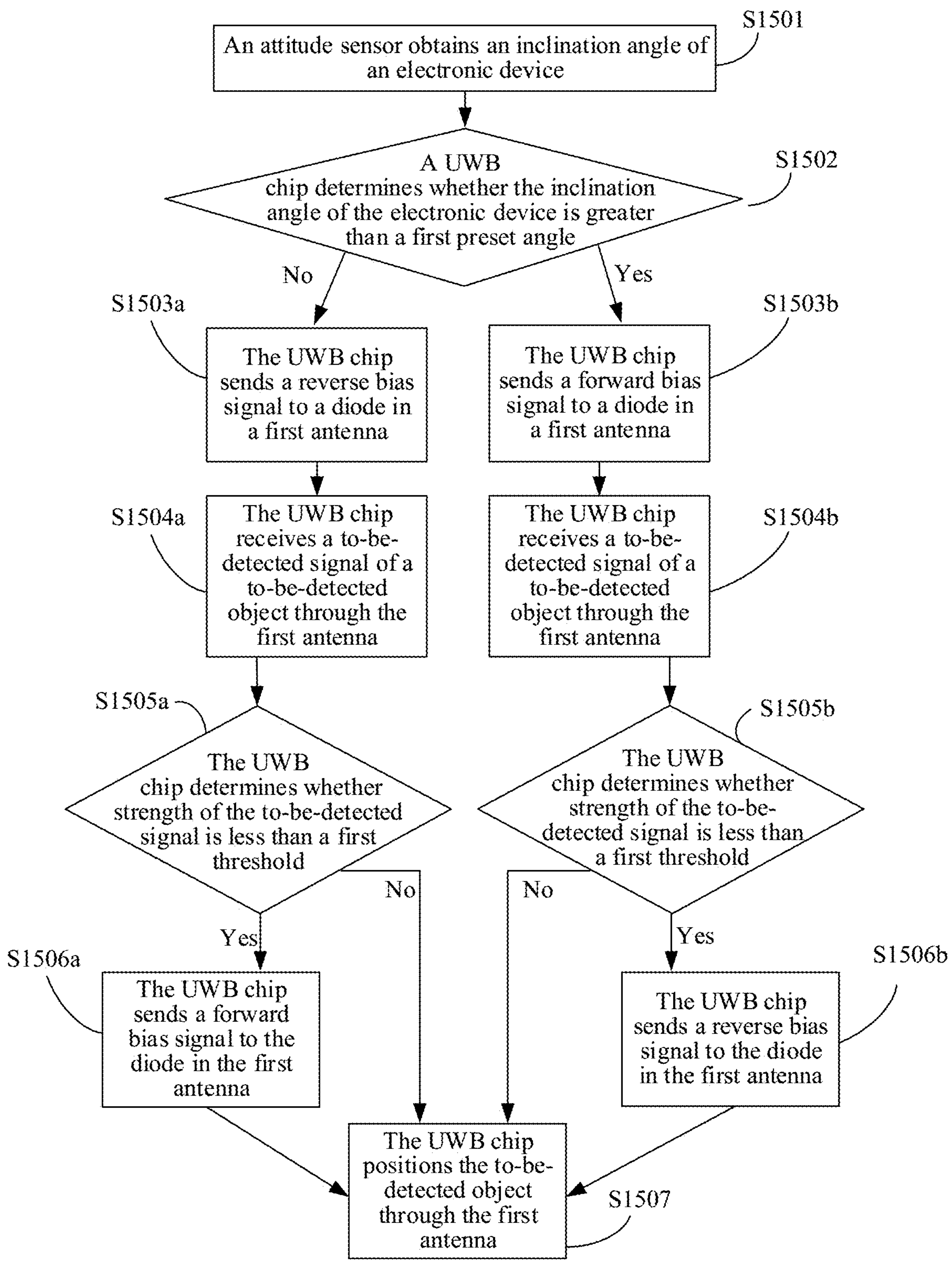
FIG. 15 is a flowchart of another method for controlling a beam direction of an antenna according to an embodiment of this application.

FIG. 15 is a flowchart of a method for controlling a beam direction of an antenna according to an embodiment of this application. As shown in FIG. 15, the method may include the following S1501 to S1507.

S1501. The attitude sensor obtains an inclination angle of the electronic device.

For example, the inclination angle of the electronic device may be measured by using the inclination angle of the electronic device when the electronic device is vertical as 0°. In this way, when the electronic device is placed horizontally, the inclination angle is 90°.

S1502. The UWB chip determines whether the inclination angle of the electronic device is greater than a first preset angle.

If not, in other words, if the UWB chip determines that the inclination angle of the electronic device is less than or equal to the first preset angle, the following steps S1503*a* to S1507 may be performed. The first preset angle is α°.

S1503*a*. The UWB chip sends a reverse bias signal to the diode in the first antenna.

The PIN diode in the first antenna is turned off in response to the reverse bias signal, so that the first antenna works in the first mode. In this case, the beam direction of the first antenna is the first direction.

Figure 16:
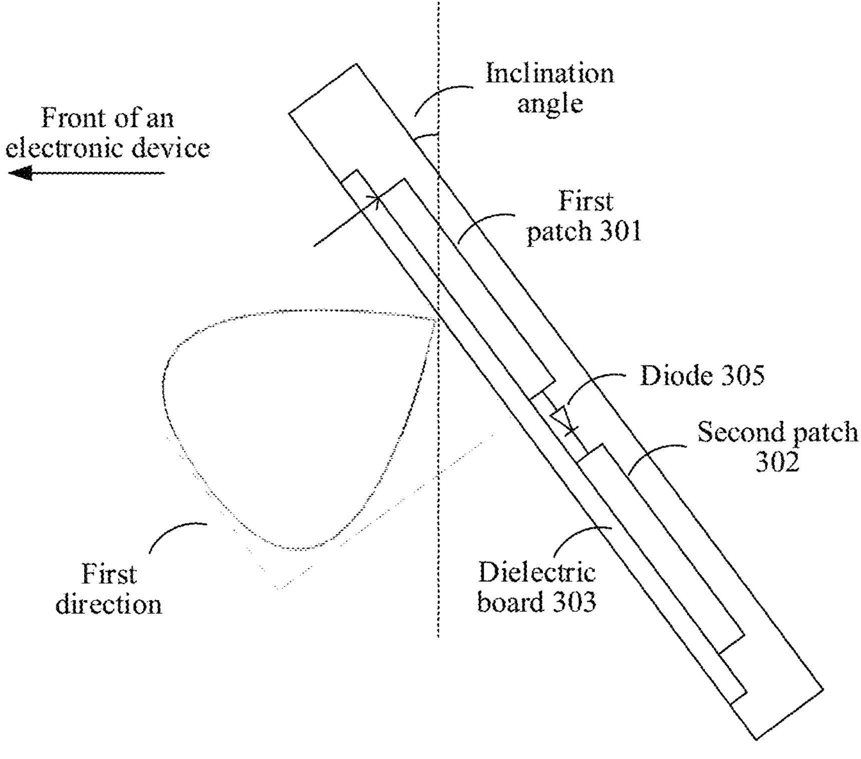
FIG. 16 is a schematic diagram of an inclined electronic device according to an embodiment of this application.

FIG. 16 is a schematic diagram of an inclined electronic device according to an embodiment of this application. As shown in FIG. 16, when the inclination angle of the electronic device is less than or equal to α°, a to-be-detected signal in front of the electronic device can be detected when the beam direction of the first antenna is the first direction. Therefore, in this embodiment of this application, the beam direction of the first antenna is adjusted to the first direction, to increase the possibility of detecting the to-be-detected object.

S1504*a*. The UWB chip receives a to-be-detected signal of the to-be-detected object through the first antenna.

S1505*a*. The UWB chip determines whether strength of the to-be-detected signal is less than the first threshold. If yes, S1506*a* is performed; and if not, S1507 is performed.

S1506*a*. The UWB chip sends a forward bias signal to the diode in the first antenna. The PIN diode in the first antenna is turned on in response to the forward bias signal, so that the first antenna works in the second mode. In this case, the beam direction of the first antenna is the second direction. In other words, if when the beam direction of the first antenna is the first direction, a to-be-detected signal with adequate strength is not detected, the UWB chip switches the beam direction of the first antenna to the second direction, so that the first antenna can continue to detect, in the second direction, the to-be-detected signal, to determine whether the to-be-detected object is located in the second direction.

For S1506*a*, reference may be made to the related description in S1302, and details are not described herein again.

S1507. The UWB chip positions the to-be-detected object through the first antenna.

Figure 17:
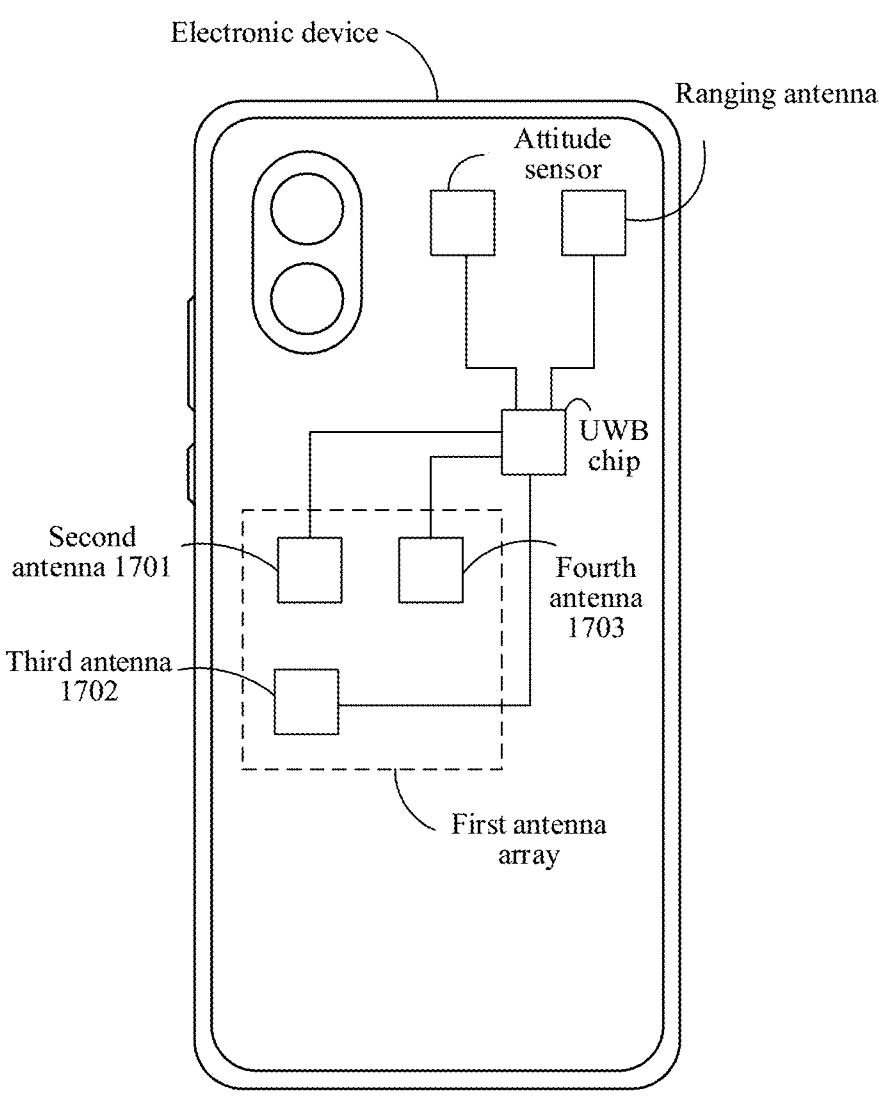
FIG. 17 is schematic diagram of a connection relationship of a first antenna array according to an embodiment of this application.

In an example, the UWB chip may position the to-be-detected object through a first antenna array formed by first antennas. FIG. 17 is schematic diagram of a connection relationship of a first antenna array according to an embodiment of this application. As shown in FIG. 17, the first antenna array may include a second antenna 1701, a third antenna 1702 horizontally arranged with the second antenna 1701, and a fourth antenna 1703 vertically arranged with the second antenna 1701.

A process of positioning the to-be-detected object by the UWB chip through the first antenna array formed by the first antennas may be as follows. The UWB chip measures a phase difference of arrival of the to-be-detected signal to the second antenna 1701 and the third antenna 1702, and a phase difference of arrival of the to-be-detected signal to the second antenna 1701 and the fourth antenna 1703. The UWB chip separately determines an angle of arrival of the to-be-detected signal to the second antenna 1701, an angle of arrival of the to-be-detected signal to the third antenna 1702, and an angle of arrival of the to-be-detected signal to the fourth antenna 1703 according to a PDOA curve corresponding to a working mode of each antenna. A ranging antenna measures a distance between the to-be-detected object and the electronic device. The UWB chip determines the position of the to-be-detected object according to an AOA positioning algorithm, the angles of arrival of the to-be-detected signal to the antennas, and the distance between the to-be-detected object and the electronic device.

If in S1502, the UWB chip determines that the inclination angle of the electronic device is greater than the first preset angle, the following steps S1503*b* to S1507 may be performed.

S1503*b*. The UWB chip sends a forward bias signal to the diode in the first antenna.

The PIN diode in the first antenna is turned on in response to the forward bias signal, so that the first antenna works in the second mode. In this case, the beam direction of the first antenna is the second direction.

Figure 18:
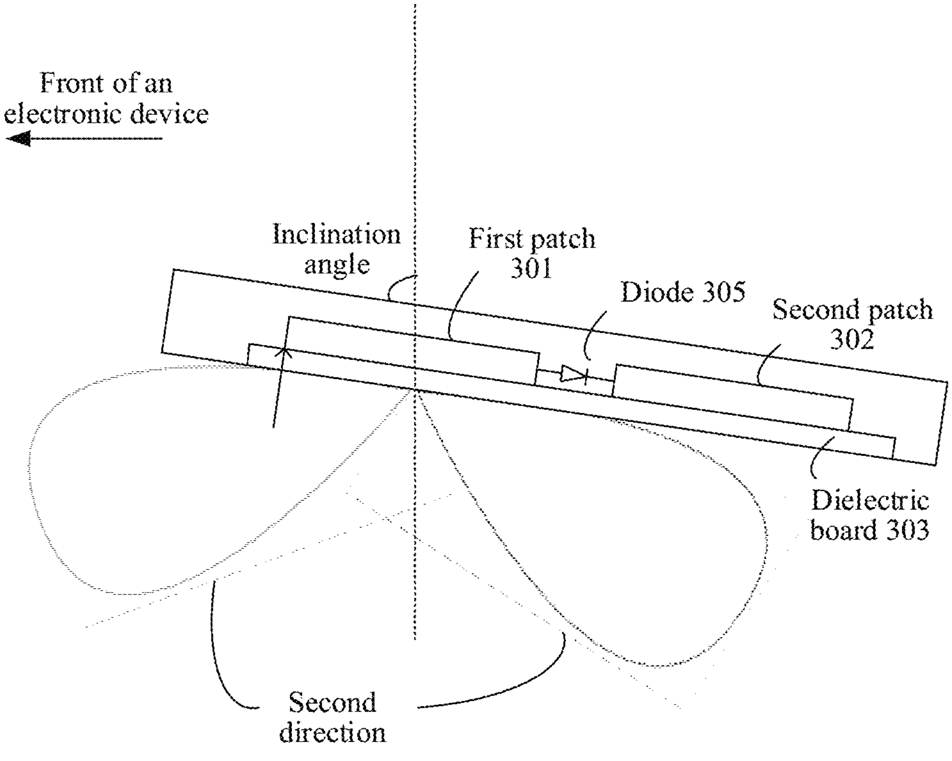
FIG. 18 is a schematic diagram of another inclined electronic device according to an embodiment of this application.

FIG. 18 is a schematic diagram of another inclined electronic device according to an embodiment of this application. As shown in FIG. 18, when the inclination angle of the electronic device is greater than α°, a to-be-detected signal in front of the electronic device can be detected when the beam direction of the first antenna is the second direction. Therefore, in this embodiment of this application, the beam direction of the first antenna is adjusted to the second direction, to increase the possibility of detecting the to-be-detected object.

S1504*b*. The UWB chip receives a to-be-detected signal of the to-be-detected object through the first antenna.

S1505*b*. The UWB chip determines whether strength of the to-be-detected signal is less than the first threshold. If yes, S1506*b* is performed; and if not, S1507 is performed.

S1506*b*. The UWB chip sends a reverse bias signal to the diode in the first antenna.

The PIN diode in the first antenna is turned off in response to the reverse bias signal, so that the first antenna works in the first mode. In this case, the beam direction of the first antenna is the first direction. In other words, if when the beam direction of the first antenna is the second direction, a to-be-detected signal with adequate strength is not detected, the UWB chip switches the beam direction of the first antenna to the first direction, so that the first antenna can continue to detect, in the first direction, the to-be-detected signal, to determine whether the to-be-detected object is located in the first direction.

For S1506*b*, reference may be made to the related description in S1302, and details are not described herein again.

S1507. The UWB chip positions the to-be-detected object through the first antenna.

The positioning process is described above, and details are not described herein again.

The following describes, by using two first antennas as an example, a process of determining angles of arrival of the to-be-detected signal to the two first antennas according to a phase difference of arrival of the to-be-detected signal to the two first antennas. For ease of description, the two first antennas are respectively referred to as a fifth antenna and a sixth antenna below.

Figure 19:
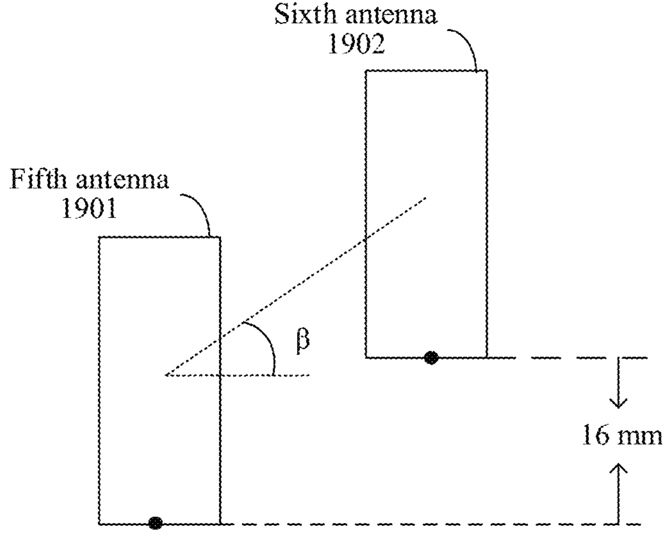
FIG. 19 is a schematic diagram of an antenna array according to an embodiment of this application.

In the following description, an antenna array formed by the fifth antenna and the sixth antenna is shown in FIG. 19. FIG. 19 is a schematic diagram of an antenna array according to an embodiment of this application. As shown in FIG. 19, the antenna array includes the fifth antenna 1901 and the sixth antenna 1902. A vertical distance between a feed point of the fifth antenna 1901 and a feed point of the sixth antenna 1902 is 16 mm. An included angle β between a straight line in which a midpoint of the fifth antenna 1901 and a midpoint of the sixth antenna 1902 are located and a horizontal direction is less than or equal to 30°.

In the following description, parameters of the fifth antenna and the sixth antenna are the same. Thicknesses of dielectric boards both are 0.3 mm, dielectric constants of the dielectric boards both are 3, and loss factors of the dielectric boards both are 0.004. Side lengths of patches in the antennas all are 10.8 mm.

After measuring a phase difference of arrival of the to-be-detected signal to the fifth antenna 1901 and the sixth antenna 1902, the electronic device may determine an angle of arrival of the to-be-detected signal to the fifth antenna 1901 and an angle of arrival of the to-be-detected signal to the sixth antenna 1902 according to a PDOA curve.

Figure 20:
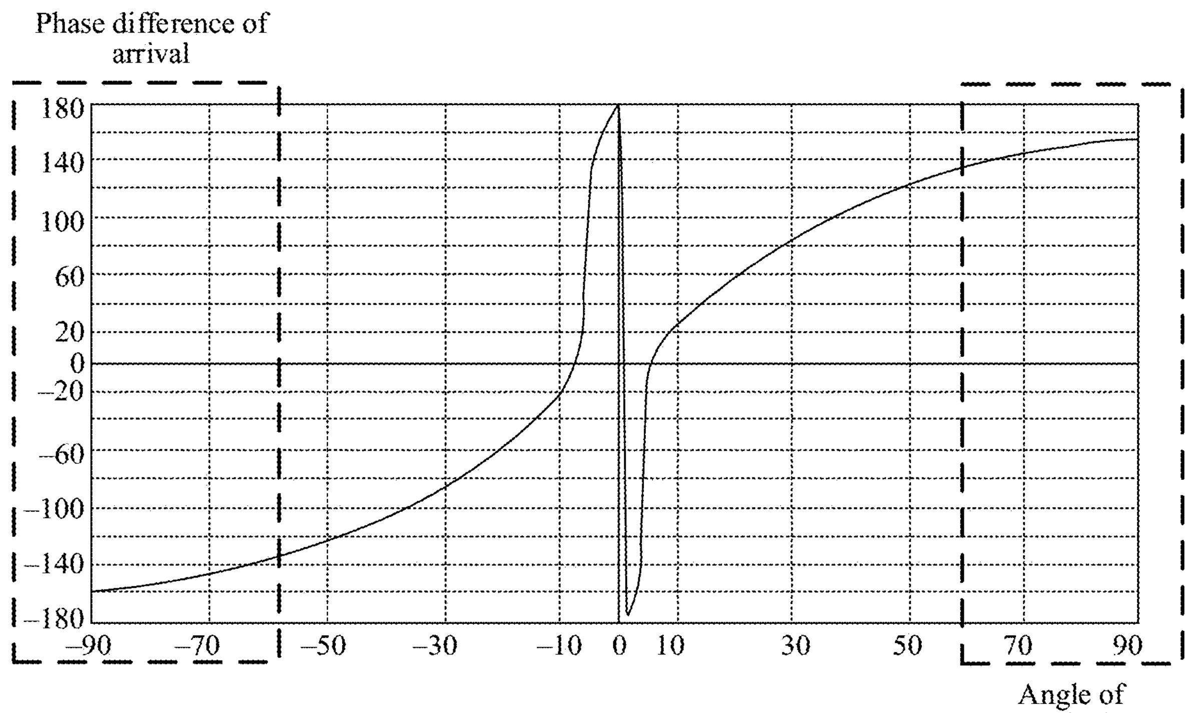
FIG. 20 is a schematic diagram of a PDOA curve according to an embodiment of this application.

Specific description is provided below by using an example in which the fifth antenna 1901 and the sixth antenna 1902 in FIG. 19 both work in the second mode FIG. 20 is a schematic diagram of a PDOA curve according to an embodiment of this application. The PDOA curve is a corresponding PDOA curve when the fifth antenna 1901 and the sixth antenna 1902 in FIG. 19 both work in the second mode. A vertical coordinate of the PDOA curve is a difference between a phase value of the to-be-detected signal upon arriving at the fifth antenna 1901 and a phase value of the to-be-detected signal upon arriving at the sixth antenna 1902, that is, the foregoing phase difference of arrival, and a horizontal coordinate is an angle of arrival. An example in which the phase difference of arrival of the to-be-detected signal to the fifth antenna 1901 and the sixth antenna 1902 measured by the electronic device is 145 is used. The electronic device may determine that the angle of arrival of the to-be-detected signal to the fifth antenna 1901 is 70° according to the PDOA curve shown in FIG. 20. Similarly, if the phase difference of arrival of the to-be-detected signal to the sixth antenna 1902 and the fifth antenna 1901 is −145, the electronic device may determine that the angle of arrival of the to-be-detected signal to the sixth antenna 1902 is −70° according to the PDOA curve shown in FIG. 20.

It is to be noted that, the PDOA curve shown in FIG. 20 is applicable only when the angle of arrival is within −90° to a negative first preset angle, or within the first preset angle to 90°, to be specific, a part framed by a dashed-line block in FIG. 20. When the angle of arrival is within the negative first preset angle to the first preset angle, the angle of arrival may be determined by using a corresponding PDOA curve when the fifth antenna 1901 and the sixth antenna 1902 both work in the first mode. Details are not described herein again.

After obtaining the angles of arrival of the to-be-detected signal to the antennas, the electronic device may position the to-be-detected object according to the AOA algorithm.

So far, a person skilled in the art should have a clear and explicit understanding of the solution to controlling a beam direction of an antenna provided in this embodiment of this application. It may be understood that, with reference to the foregoing description, the antenna and the method for controlling a beam direction of an antenna provided in the embodiments of this application can expand the coverage range of the beam direction of the UWB antenna and thereby improve the positioning ability of the UWB antenna.

The solutions provided in the embodiments of this application are mainly described above from the perspective of the electronic device. To implement the foregoing functions, the electronic device includes corresponding hardware structures and/or software modules for performing the functions. A person skilled in the art should be easily aware that, in combination with the units and algorithm steps of the examples described in the embodiments disclosed in this specification, this application can be implemented by hardware or a combination of hardware and computer software. Whether a function is performed by hardware or computer software driving hardware depends on particular applications and design constraints of the technical solutions. A person skilled in the art may use different methods to implement the described functions for each particular application, but it should not be considered that the implementation goes beyond the scope of this application.

In the embodiments of this application, functional modules of the device may be divided based on the foregoing method example. For example, each functional module may be divided according to each function, or two or more functions may be integrated into one processing module. The integrated module is implemented in the form of hardware, or is implemented in the form of a software functional module. It is to be noted that, in the embodiments of this application, the module division is an example, and is merely logical function division, and there may be other division modes during actual implementation.

Figure 21:
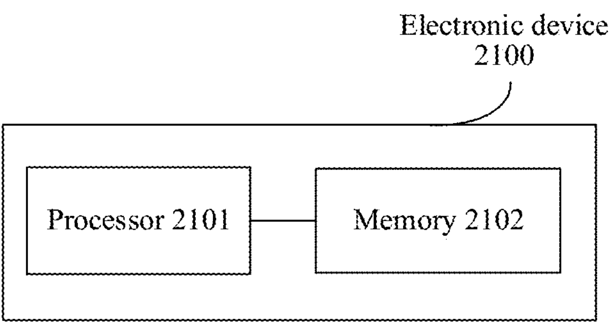
FIG. 21 is a schematic diagram of an electronic device according to an embodiment of this application.

FIG. 21 is a schematic diagram of composition of an electronic device 2100 according to an embodiment of this application. The electronic device 2100 may be any electronic device in the foregoing examples, for example, the electronic device 2100 may be a mobile phone, a computer, or the like. For example, as shown in FIG. 21, the electronic device 2100 may include: a processor 2101 and a memory 2102. The memory 2102 is configured to store a computer execution instruction. For example, in some embodiments, when the processor 2101 executes the instruction stored in the memory 2102, the electronic device 2100 may be enabled to perform any one of functions of the electronic device in the foregoing embodiments, to implement any method for controlling a beam direction of an antenna in the foregoing examples.

It is to be noted that, all related content of the steps in the foregoing method embodiment may be quoted to functional descriptions of corresponding functional modules, and details are not described herein again.

Figure 22:
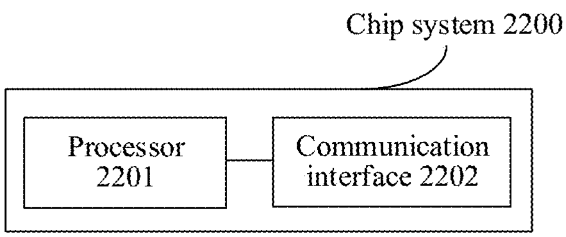
FIG. 22 is a schematic diagram of a chip system according to an embodiment of this application.

FIG. 22 is a schematic diagram of composition of a chip system 2200 according to an embodiment of this application. The chip system 2200 may be arranged in an electronic device. For example, the chip system 2200 may be arranged in a mobile phone. For example, the chip system 2200 may include: a processor 2201 and a communication interface 2202, configured to support the electronic device in implementing the functions involved in the foregoing embodiments. In a possible design, the chip system 2200 further includes a memory. The memory is configured to store a program instruction and data necessary to the electronic device. The chip system may include a chip, or may include a chip and another discrete device. It is to be noted that, in some implementations of this application, the communication interface 2202 may also be referred to as an interface circuit.

It is to be noted that, all related content of the steps in the foregoing method embodiment may be quoted to functional descriptions of corresponding functional modules, and details are not described herein again.

All or some of the functions or motions or operations or steps in the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

Although this application is described with reference to specific features and the embodiments thereof, apparently, various modifications and combinations may be made to them without departing from the spirit and scope of this application. Correspondingly, this specification and the accompanying drawings are merely used as exemplary descriptions of this application defined by the appended claims, and are considered as having covered any of and all of modifications, variations, combinations, or equivalents within the scope of this application. Obviously, a person skilled in the art can make various modifications and variations to this application without departing from the spirit and scope of this application. If these modifications and variations of this application fall within the scope of the claims of this application and equivalent technologies thereof, this application is intended to include these modifications and variations.

What is claimed is:

1. A terminal antenna, used in a UWB antenna array, wherein the UWB antenna array is configured to position a to-be-detected object; and the terminal antenna comprises: a first radiator, a second radiator, and a switch module, wherein the first radiator and the second radiator both are patches;

the first radiator is connected to a first end of the switch module, and the second radiator is connected to a second end of the switch module;

the first radiator is provided with a feed point;

a working status of the switch module comprises an on state and an off state;

the first radiator and the second radiator have the same long side length; and neither of the first radiator and the second radiator is provided with a ground point;

wherein when the working status of the switch module is the off state, a current in the first radiator flows from an end on which the feed point is located to an end of the first radiator connected to the switch module; and when the working status of the switch module is the on state, the current in the first radiator flows from the end of the first radiator connected to the switch module to the end on which the feed point is located, and a current in the second radiator flows from an end of the second radiator connected to the switch module to another end of the second radiator.

2. The terminal antenna according to claim 1, wherein the terminal antenna is a UWB terminal antenna, and further comprises a dielectric board and a grounding board; and the first radiator and the second radiator are arranged above the dielectric board, and the grounding board is arranged below the dielectric board.

3. The terminal antenna according to claim 1, wherein when the working status of the switch module is the off state, a beam direction of a main lobe of the terminal antenna is a first direction; and when the working status of the switch module is the on state, the beam direction of the main lobe of the terminal antenna is a second direction, wherein the first direction and the second direction are different.

4. The terminal antenna according to claim 1, wherein the switch module is a PIN diode.

5. The terminal antenna according to claim 1, wherein an end of the second radiator away from the switch module is open-circuited.

6. The terminal antenna according to claim 1, wherein the length of the long side of at least one of the first radiator and the second radiator is determined based on a half of a wavelength of an operating frequency band of the terminal antenna.

7. An electronic device, comprising: a first chip and a terminal antenna;

wherein the terminal antenna comprises: a first radiator, a second radiator, and a switch module, wherein the first radiator and the second radiator are patches;

the first radiator is connected to a first end of the switch module, and the second radiator is connected to a second end of the switch module;

the first radiator is provided with a feed point;

a working status of the switch module comprises an on state and an off state;

the first radiator and the second radiator have the same long side length; and neither of the first radiator and the second radiator is provided with a ground point;

the first chip is connected to the switch module and the feed point separately;

the terminal antenna is configured to receive a to-be-detected signal sent by a to-be-detected object;

the first chip is configured to obtain the to-be-detected signal through the feed point; and the first chip is further configured to control the working status of the switch module according to strength of the to-be-detected signal;

wherein when the working status of the switch module is the on state, and the strength of the to-be-detected signal is less than a first threshold, the first chip switches the working status of the switch module to the off state; or when the working status of the switch module is the off state, and the strength of the to-be-detected signal is less than the first threshold, the first chip switches the working status of the switch module to the on state.

8. The electronic device according to claim 7, wherein when the strength of the to-be-detected signal is less than the first threshold, the first chip switches the working status of the switch module.

9. The electronic device according to claim 7, comprising an attitude sensor, wherein the attitude sensor is connected to the first chip;

the attitude sensor is configured to detect and determine an inclination angle of the electronic device; and the first chip is configured to control the working status of the switch module according to the inclination angle.

10. A method for controlling a beam direction of an antenna, wherein the method is for positioning a to-be-detected object and is applied to an electronic device; wherein the electronic device comprising a first chip and a terminal antenna;

wherein the terminal antenna comprises: a first radiator, a second radiator, and a switch module, wherein the first radiator and the second radiator are patches;

the first radiator is connected to a first end of the switch module, and the second radiator is connected to a second end of the switch module;

the first radiator is provided with a feed point;

a working status of the switch module comprises an on state and an off state;

the first radiator and the second radiator have the same long side length; and neither of the first radiator and the second radiator is provided with a ground point;

the first chip is connected to the switch module and the feed point separately;

the terminal antenna is configured to receive a to-be-detected signal sent by a to-be-detected object;

the first chip is configured to obtain the to-be-detected signal through the feed point; and the first chip is further configured to control the working status of the switch module according to strength of the to-be-detected signal;

the method comprises:

receiving, by the terminal antenna, a to-be-detected signal sent by a to-be-detected object; and controlling, by the first chip, the working status of the switch module according to strength of the to-be-detected signal;

wherein the controlling, by the first chip, the working status of the switch module according to the strength of the to-be-detected signal comprises:

controlling, by the first chip, the working status of the switch module to be the on state when an inclination angle of the electronic device is greater than a first preset angle; and controlling, by the first chip, the working status of the switch module to be the off state when the inclination angle is less than or equal to the first preset angle.

11. The method according to claim 10, wherein the electronic device comprises an attitude sensor; and before the controlling, by the first chip, the working status of the switch module according to strength of the to-be-detected signal, the method further comprises:

determining, by the attitude sensor, the inclination angle of the electronic device; and controlling, by the first chip, the working status of the switch module according to the inclination angle.

12. The method according to claim 11, wherein an inclination angle at which the electronic device is placed vertically is used by the attitude sensor as a 0 degree inclination angle.

13. The method according to claim 10, wherein the first preset angle is 60 degrees.

* * * * *